(12) United States Patent
Auringer et al.

(10) Patent No.: US 9,677,792 B2
(45) Date of Patent: Jun. 13, 2017

(54) MAGNETIC REFRIGERATION SYSTEM WITH SEPARATED INLET AND OUTLET FLOW

(71) Applicant: Astronautics Corporation of America, Milwaukee, WI (US)

(72) Inventors: Jon Jay Auringer, Poynette, WI (US); Andre Michael Boeder, Monona, WI (US); Jeremy Jonathan Chell, Madison, WI (US); John Paul Leonard, Cambridge, WI (US); Carl Bruno Zimm, Madison, WI (US)

(73) Assignee: ASTRONAUTICS CORPORATION OF AMERICA, Milwaukee, WI (US)

( * ) Notice: Subject to any disclaimer, the term of this patent is extended or adjusted under 35 U.S.C. 154(b) by 236 days.

(21) Appl. No.: 14/569,450

(22) Filed: Dec. 12, 2014

(65) Prior Publication Data
US 2016/0025385 A1    Jan. 28, 2016

Related U.S. Application Data

(60) Provisional application No. 62/029,697, filed on Jul. 28, 2014.

(51) Int. Cl.
*F25B 21/00*    (2006.01)
(52) U.S. Cl.
CPC ........ *F25B 21/00* (2013.01); *F25B 2321/002* (2013.01); *Y02B 30/66* (2013.01)

(58) Field of Classification Search
CPC ..... F25B 21/00; F25B 2321/002; Y02B 30/66
See application file for complete search history.

(56) References Cited

U.S. PATENT DOCUMENTS

| | | | |
|---|---|---|---|
| 4,332,135 A | 6/1982 | Barclay et al. | |
| 5,934,078 A | 8/1999 | Lawton et al. | |
| 6,526,759 B2 * | 3/2003 | Zimm | F25B 21/00 62/3.1 |
| 2010/0071383 A1 | 3/2010 | Zhang et al. | |
| 2013/0104568 A1 | 5/2013 | Kuo et al. | |
| 2014/0165595 A1 | 6/2014 | Zimm et al. | |

OTHER PUBLICATIONS

International Search Report and Written Opinion in International Application No. PCT/US2014/070106 mailed Mar. 10, 2015 (11 pages).

(Continued)

*Primary Examiner* — Emmanuel Duke
(74) *Attorney, Agent, or Firm* — Foley & Lardner LLP

(57) ABSTRACT

An active magnetic regenerative (AMR) refrigerator apparatus can include at least one AMR bed with a first end and a second end and a first heat exchanger (HEX) with a first end and a second end. The AMR refrigerator can also include a first pipe that fluidly connects the first end of the first HEX to the first end of the AMR bed and a second pipe that fluidly connects the second end of the first HEX to the first end of the AMR bed. The first pipe can divide into two or more sub-passages at the AMR bed. The second pipe can divide into two or more sub-passages at the AMR bed. The sub-passages of the first pipe and the second pipe can interleave at the AMR bed.

17 Claims, 25 Drawing Sheets

(56) References Cited

OTHER PUBLICATIONS

Engelbrecht, et al., "Recent Developments in Room Temperature Active Magnetic Regenerative Refrigeration," HVAC&R Research, 13 (2007) pp. 525-542.

Russek, et al., "Potential for cost effective magnetocaloric air conditioning systems," International Journal of Refrigeration, vol. 29, Issue 8, Dec. 2006, pp. 1366-1373.

Tagliafico, et al., "Dynamic 1D Model of an Active Magnetic Regenerator: A Parametric Investigation," Strojniski vestnik—Journal of Mechanical Engineering 58(2012) 1, pp. 9-15.

Zimm, et al., "Description and Performance of a Near-Room Temperature Magnetic Refrigerator", Advances in Cryogenic Engineering, 43, pp. 1759-1766 (1998).

Zimm, et al., "Design and Performance of a Permanent Magnet Rotary Refrigerator," International Journal of Refrigeration, vol. 29, pp. 1302-1306 (2006).

\* cited by examiner

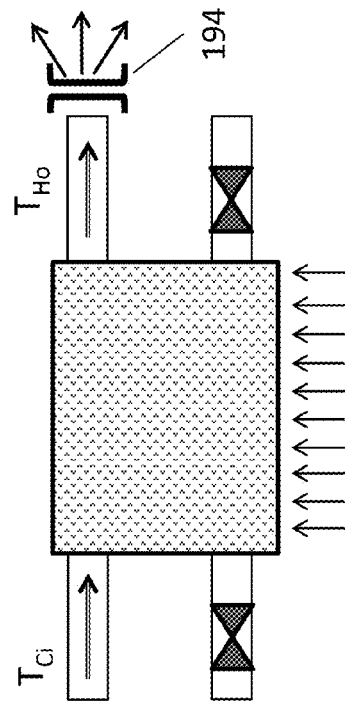
Figure 1A: Magnetization
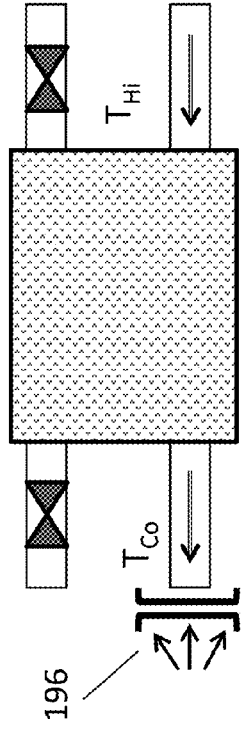
Figure 1B: Cold to hot flow
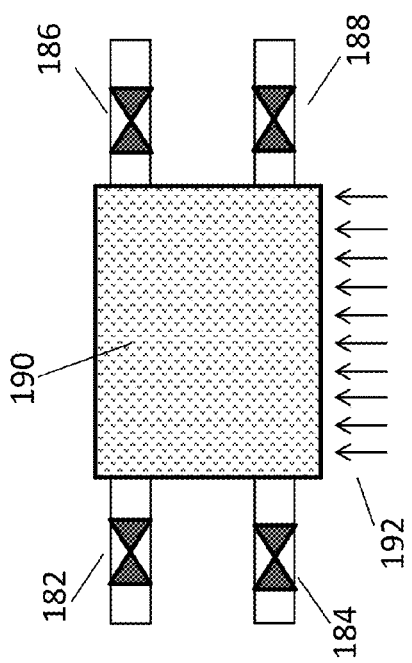
Figure 1C: Demagnetization
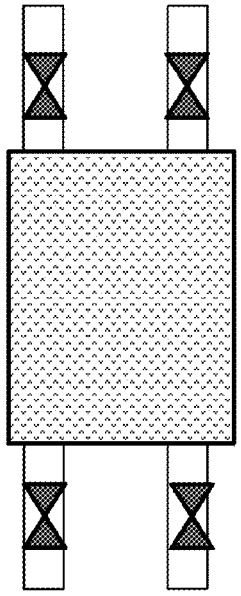
Figure 1D: Hot to cold flow
Flow blocked
Flow

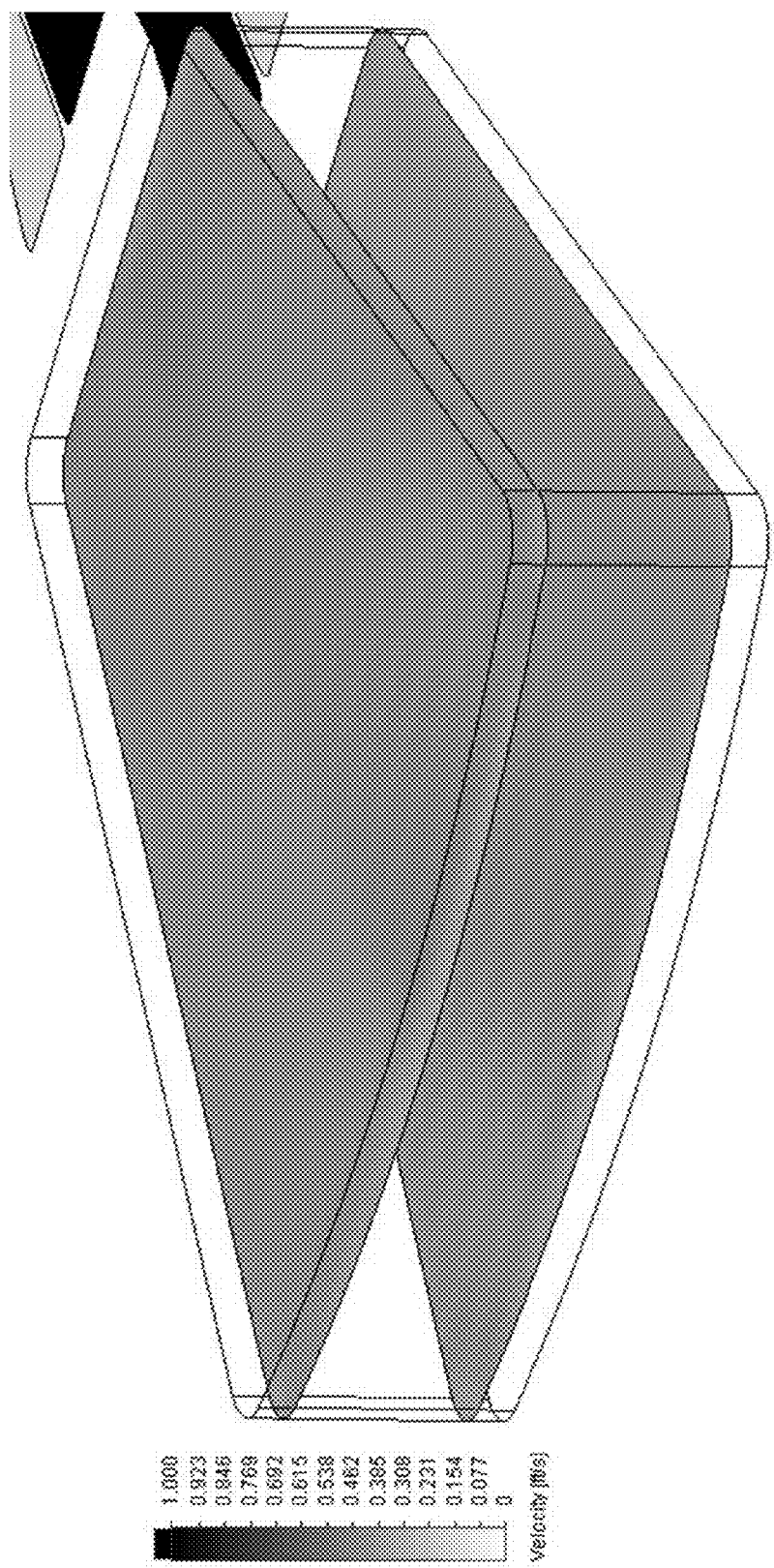
Fig. 11 (flow model results for configuration of Fig. 10)

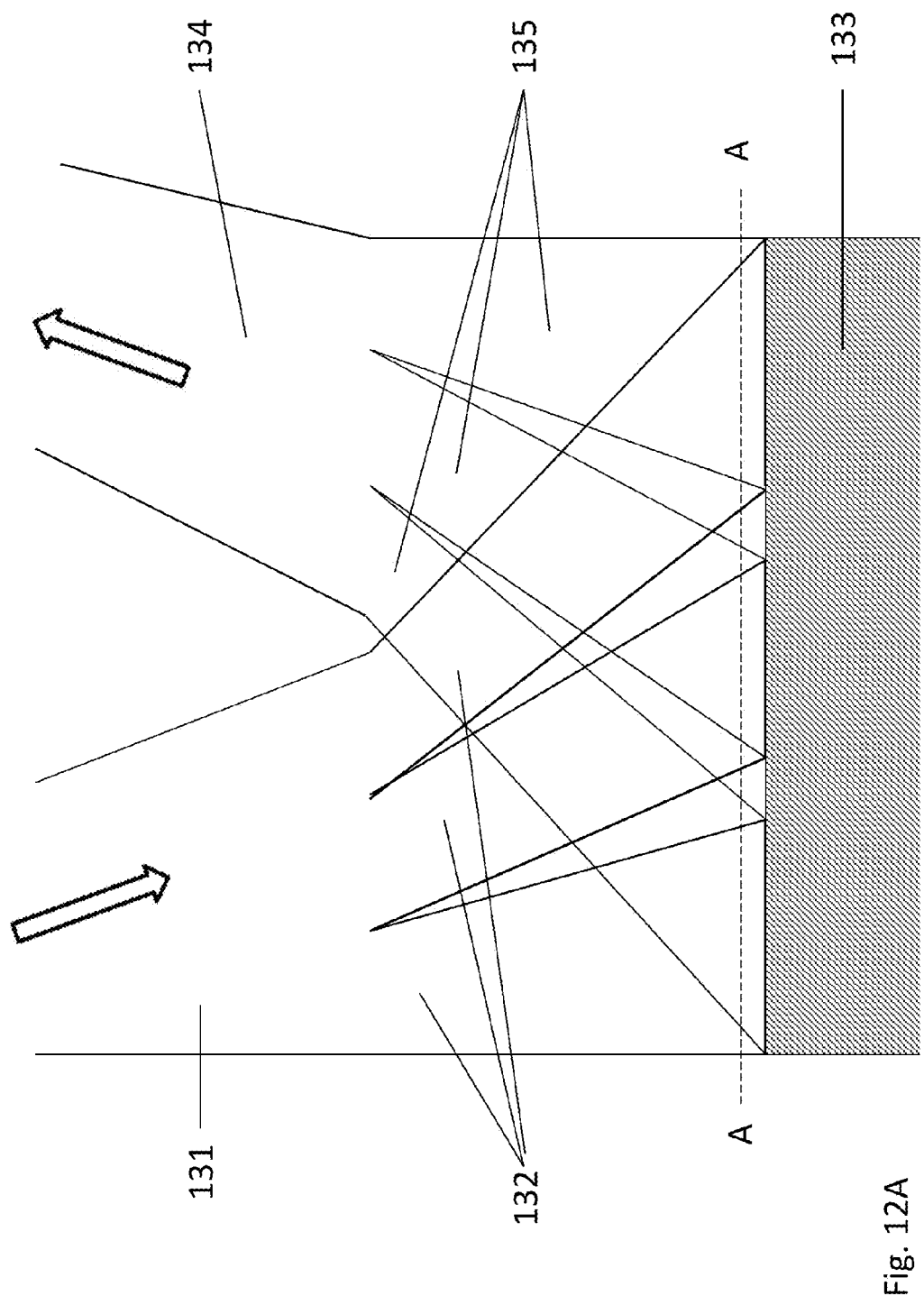

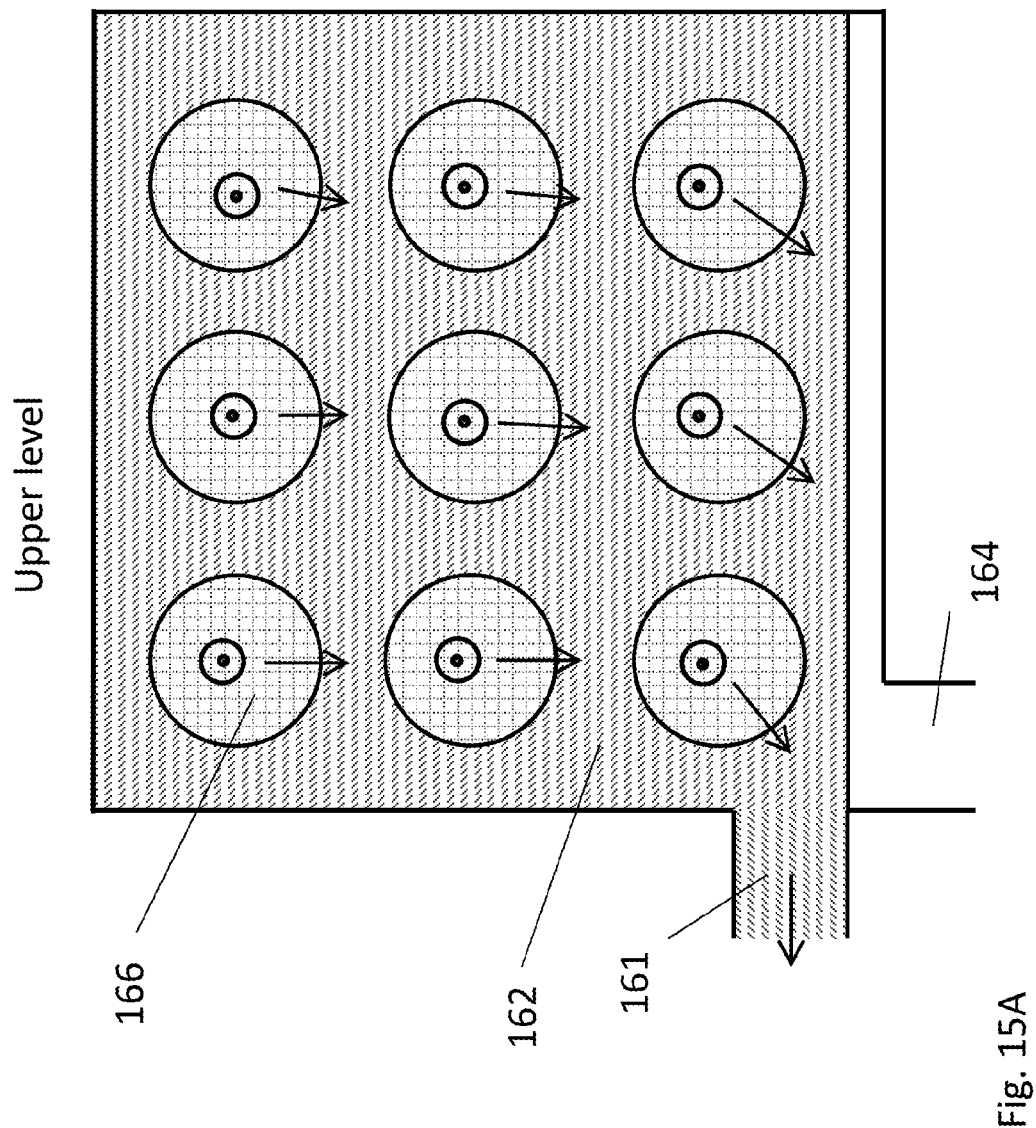

MAGNETIC REFRIGERATION SYSTEM WITH SEPARATED INLET AND OUTLET FLOW

CROSS-REFERENCE TO RELATED APPLICATIONS

The present application claims the benefit of U.S. Provisional Patent Application Ser. No. 62/029,697 filed Jul. 28, 2014, which is incorporated herein by reference in its entirety.

FEDERAL FUNDING STATEMENT

This invention was made with government support under DE-AR0000128 awarded by U.S. Department of Energy. The U.S. Government has certain rights in this invention.

BACKGROUND

Magnetic refrigeration (MR) refers generally to refrigeration systems that take advantage of the magnetocaloric effect of certain magnetocaloric materials. The magnetocaloric effect refers in part to the temperature change of a magnetocaloric material that occurs as a result of exposure of the magnetocaloric material to a changing magnetic field. Modern room-temperature magnetic refrigeration (MR) systems may employ an Active Magnetic Regenerator (AMR) cycle to perform cooling.

SUMMARY

The subject matter disclosed herein concerns the conveyance of heat transfer fluid between an AMR bed and its heat source (cold side heat exchanger (CHEX)) or heat sink (hot side heat exchanger (HHEX)). An active magnetic regenerative (AMR) refrigerator apparatus can include at least one AMR bed with a first end and a second end and a first heat exchanger (HEX) with a first end and a second end. The AMR refrigerator can also include a first pipe that fluidly connects the first end of the first HEX to the first end of the AMR bed and a second pipe that fluidly connects the second end of the first HEX to the first end of the AMR bed. The first pipe can divide into two or more sub-passages at the AMR bed. The second pipe can divide into two or more sub-passages at the AMR bed. The sub-passages of the first pipe and the second pipe can interleave at the AMR bed.

An active magnetic regenerative (AMR) refrigerator can include at least one AMR bed with a first end and a second end, a first heat exchanger (HEX) with a first end and a second end, and a heat transfer fluid. The AMR refrigerator can further include a first pipe that fluidly connects the first end of the first HEX to the first end of the AMR bed and a second pipe that fluidly connects the second end of the first HEX to the first end of the AMR bed. The AMR refrigerator can also include a pump configured to drive the heat transfer fluid through the first pipe, the second pipe, the first HEX, and pores of the AMR bed. The first pipe can spread out into a first region at the first end of the AMR bed, and the second pipe can spread out into second sub-passages in a second region between the first end of the AMR bed and the first region. The first region can be fluidly connected to the first end of the AMR bed by first sub-passages spread out between the second sub-passages in the second region.

An active magnetic regenerative (AMR) refrigerator can include at least one AMR bed with a first end and a second end, a heat exchanger (HEX), and a heat transfer fluid. The AMR refrigerator can further include a first pipe that fluidly connects the first end of the HEX to the first end of the AMR bed and a second pipe that fluidly connects the second end of the HEX to the first end of the AMR bed. The AMR refrigerator can also include a pump that is configured to drive the heat transfer fluid through the first pipe, the second pipe, the HEX, and pores of the AMR bed. The first pipe can be connected to a first channel extending over a first portion of the first end of the AMR bed, and the second pipe can be connected to a second channel extending over a second portion of the first end of the AMR bed. The first channel can be fluidly connected to the AMR bed through slots formed in a lower wall of the first channel that extend under a portion of the second channel. The second channel can be fluidly connected to the AMR bed through slots formed in a lower wall of the second channel that extend under a portion of the first channel.

An active magnetic regenerative (AMR) refrigerator can include at least one AMR bed with a first end and a second end, a heat exchanger (HEX), and a heat transfer fluid. The AMR refrigerator can further include a first pipe that connects the HEX to the first end of the AMR bed. The first pipe can be configured to direct the heat transfer fluid in a unidirectional flow in a first mode of operation. The first pipe can be further configured to direct the heat transfer fluid in a second unidirectional flow in a second mode of operation. The AMR refrigerator can further include a pump that is configured to drive the heat transfer fluid in the first unidirectional flow and the second unidirectional flow.

An active magnetic regenerative (AMR) refrigerator apparatus can include a first AMR bed with a cold end and a hot end. The first AMR bed can comprise a magnetocaloric material. The AMR refrigerator apparatus can further include a magnet configured to apply a time-varying magnetic field to the first AMR bed in a high state and a low state, a cold heat exchanger (CHEX) with an inlet end and an outlet end, a hot heat exchanger (HHEX) with an inlet end and an outlet end, and a heat transfer fluid. The AMR refrigerator apparatus can also include valves that are configured to direct flow of the heat transfer fluid from the cold end of the first AMR bed, through the first AMR bed, and to the hot end of the first AMR bed when the time-varying magnetic field applied to the first AMR bed is in the high state. The valves can be further configured to direct flow of the heat transfer fluid from the HHEX, to the hot end of the first AMR bed, through the first AMR bed, to the cold end of the first AMR bed, and through the CHEX when the time-varying magnetic field applied to the first AMR bed is in the low state. The AMR refrigerator apparatus can further include a first pipe that fluidly connects the inlet end of the CHEX to the cold end of the first AMR bed. The first pipe can divide into two or more sub-passages at the first AMR bed. The AMR refrigerator apparatus can also include a second pipe that fluidly connects the outlet end of the CHEX to the cold end of the first AMR bed. The second pipe can divide into two or more sub-passages at the first AMR bed. The AMR refrigerator apparatus can include a third pipe that fluidly connects the inlet end of the HHEX to the hot end of the first AMR bed. The third pipe can divide into two or more sub-passages at the first AMR bed. The AMR refrigerator apparatus can further include a fourth pipe that fluidly connects the outlet end of the HHEX to the hot end of the first AMR bed. The fourth pipe can divide into two or more sub-passages at the first AMR bed. Additionally, the AMR refrigerator apparatus can include a pump that is configured to drive the heat transfer fluid through the first AMR bed, the CHEX, the HHEX, the valves, the first pipe, the second pipe, the third pipe, and the fourth pipe.

A method can include pumping a heat transfer fluid through a first pipe from a first end of a first heat exchanger (HEX) to a first end of an active magnetic regenerative (AMR) bed. The first pipe can divide into two or more sub-passages at the AMR bed. The method can also include pumping the heat transfer fluid through a second pipe to a second end of the first HEX from the first end of the AMR bed. The second pipe can divide into two or more sub-passages at the AMR bed. The sub-passages of the first pipe and the second pipe can interleave at the AMR bed.

A method can comprise applying a time-varying magnetic field to an active magnetic regenerative (AMR) bed in a first mode of operation and applying the time-varying magnetic field to the AMR bed in a second mode of operation. The method can include pumping a heat transfer fluid through a first pipe that connects a heat exchanger (HEX) to a first end of the AMR bed in a unidirectional flow when the time-varying magnetic field is in the first mode of operation, and pumping the heat transfer fluid through the first pipe in a second unidirectional flow in a second mode of operation. The first unidirectional flow and the second unidirectional flow can be opposite from each other.

BRIEF DESCRIPTION OF THE DRAWINGS

FIGS. 1A, 1B, 1C, and 1D show a magnetic refrigerator system using the AMR cycle.

FIG. 11 shows the results of a simulation of the flow in an AMR bed of similar configuration to FIG. 10 in accordance with an illustrative embodiment.

FIGS. 12A, 12B, and 12C show an AMR bed, with inlet and outlet pipes divided into multiple sub-passage pipes that interleave in accordance with an illustrative embodiment.

FIGS. 15A, 15B, and 15C show an AMR bed, with an upper inlet region that connects to the AMR bed with multiple sub-passage pipes that pass through a lower inlet region in accordance with an illustrative embodiment.

DETAILED DESCRIPTION

Figure 2A:
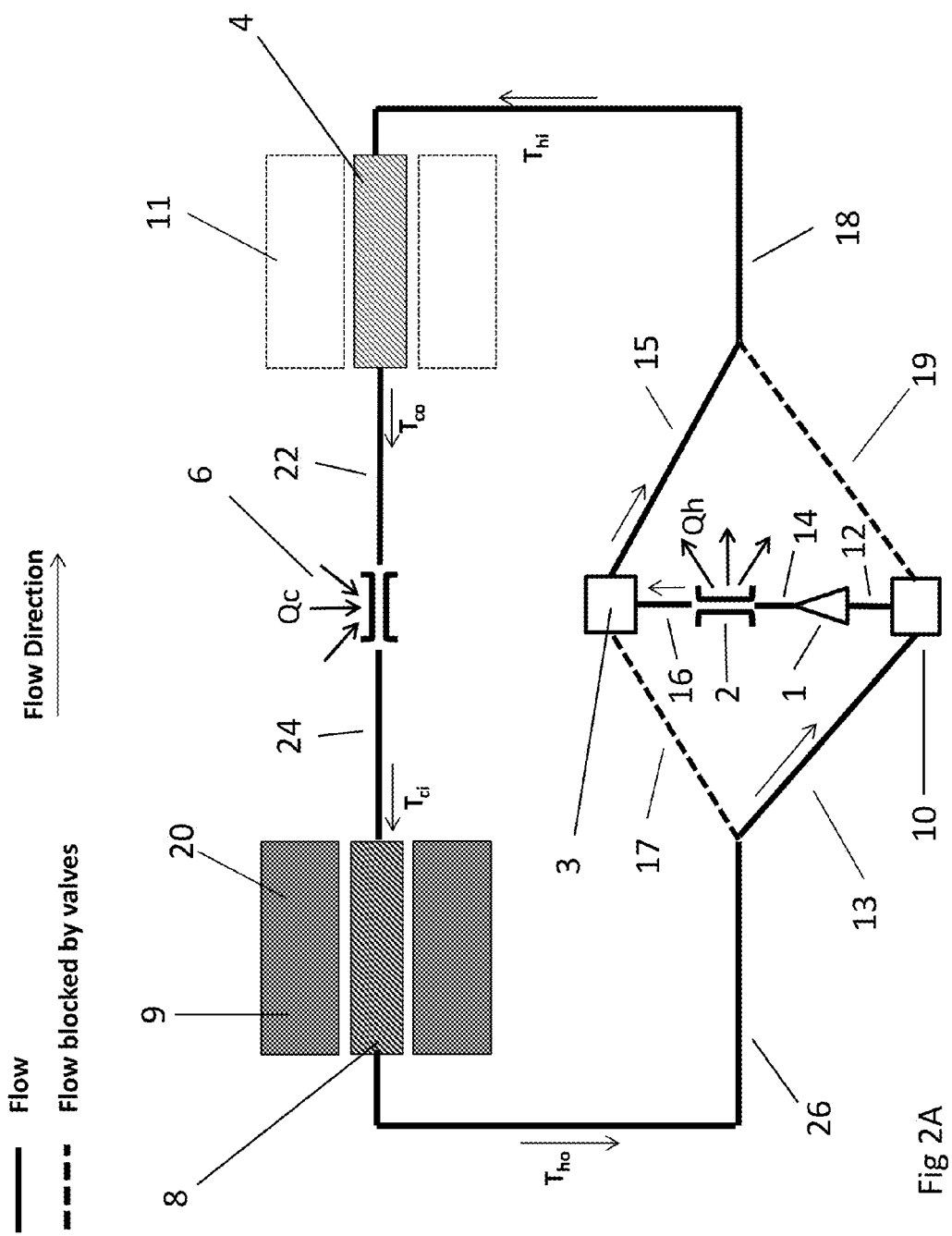
FIG. 2A is a diagram illustrating AMR mode operation in a two bed magnetic refrigeration system with a magnet that is in periodic motion and in a first position.

Described herein are improved systems for the conveyance of heat transfer fluid between an AMR bed and its heat source (or cold side heat exchanger (CHEX)) or heat sink (or hot side heat exchanger (HHEX)). In an illustrative embodiment, one way to implement the AMR cycle is to arrange sector-shaped beds of magnetocaloric material in a wheel assembly, and apply a magnetic field to a sector-shaped section of the wheel using a sector-shaped magnet. The magnetocaloric material beds are porous to fluid flow. The pores in the beds that carry the fluid flow could be in many different forms, including connected porosity or channels in a solid matrix, or connected interstices between either particles, plates, or screens.

In an illustrative embodiment, a set of valves and a pump are set up to enable flow to be sent through the beds in either direction. The pump might be a continuously acting pump accompanied by time sequenced valves, or the pump may be a reciprocating displacer accompanied by one-way valves, or, in alternative embodiments, other arrangements may be used. For AMR operation, either the wheel is rotated or the magnet is rotated. This rotation produces a changing magnetic field on the beds, and flow is directed though the beds, with the flow direction switched by valves in synchrony with the position of the wheel or magnet.

An early implementation of the AMR cycle can be found in U.S. Pat. No. 4,332,135, the entire disclosure of which is incorporated herein by reference. The AMR cycle has four stages, as shown schematically in FIGS. 1$a$ to 1$d$. The MR system in FIGS. 1$a$ to 1$d$ includes a porous bed of magnetocaloric material (MCM) 190 and a heat transfer fluid, which exchanges heat with the MCM as it flows through the MCM bed 190. In FIGS. 1$a$ to 1$d$, the left side of the bed is the cold side, while the hot side is on the right. In alternative embodiments, the hot and cold sides may be reversed. The timing and direction (hot-to-cold or cold-to-hot) of the fluid flow may be coordinated with the application and removal of a magnetic field. As illustrative examples, the magnet field may be provided by a permanent magnet, an electromagnet, or a superconducting magnet.

In an illustrative example of an AMR cycle, FIG. 1$a$, the first stage of the cycle, magnetization occurs. While the fluid in the MCM bed 190 is stagnant, a magnetic field 192 is applied to the MCM bed 190, causing it to heat if the temperature of the MCM is near that of a ferromagnetic phase transition. In the magnetization stage of FIG. 1a, the four valves are all closed, preventing fluid flow through the MCM bed 190. The four valves include a cold inlet valve 182, a cold outlet valve 184, a hot outlet valve 186, and a hot inlet valve 188. In FIG. 1b, the second stage of the cycle, cold-to-hot-flow occurs. The magnetic field 192 over the MCM bed 190 is maintained, and fluid at a temperature $T_{Ci}$ (the cold inlet temperature) is pumped through the MCM bed 190 from the cold side to the hot side. The cold inlet valve 182 and hot outlet valve 186 are open during this stage to facilitate movement of the fluid through the MCM bed 190. The cold outlet valve 184 and the hot inlet valve 188 are closed during this stage. The fluid removes heat from each section of the MCM bed 190, cooling the MCM bed 190 and warming the fluid as it passes to the next section of the MCM bed 190, where the process continues at a higher temperature. The fluid eventually reaches the temperature $T_{Ho}$ (the hot outlet temperature), where it exits the MCM bed 190 through the hot outlet valve 186. Typically, this fluid is circulated through a hot side heat exchanger (HHEX) 194, where it exhausts its heat to the ambient environment. In FIG. 1c, the third stage of demagnetization occurs. The fluid flow is terminated when the cold inlet valve 182 and the hot outlet valve 186 are closed and the magnetic field 192 is removed. The cold outlet valve 184 and the hot inlet valve 188 are also closed during this stage. This causes the MCM bed 190 to cool further. In FIG. 1d, the final stage of the cycle, hot-to-cold-flow occurs. During this last stage, fluid at a temperature $T_{Hi}$ (the hot inlet temperature) is pumped through the MCM bed 190 from the hot side to the cold side in the continued absence of the magnetic field 192. Also in this stage, cold outlet valve 184 and hot inlet valve 188 are open, while cold inlet valve 182 and hot outlet valve 186 are closed. The fluid adds heat to each section of the MCM bed 190, warming the MCM bed 190 and cooling the fluid as it passes to the next section of the MCM bed 190, where the process continues at a lower temperature. The fluid eventually reaches a temperature $T_{Co}$ (the cold outlet temperature) which is the coldest temperature reached by the fluid in the cycle. Typically, this colder fluid is circulated through a cold side heat exchanger (CHEX) 196, where it picks up heat from the refrigerated system, allowing this system to maintain its cold temperature.

A major advantage of the AMR cycle is noted in K. L. Engelbrecht, G. F Nellis, S. A Klein, and C. B. Zimm, Recent Developments in Room Temperature Active Magnetic Regenerative Refrigeration, HVAC&R Research, 13 (2007) pp. 525-542 (hereinafter "Engelbrecht et al."), the entire disclosure of which is incorporated herein by reference. The advantage is that the span (the temperature at which the heat is exhausted minus the temperature at which heat is absorbed) can be much larger than the absolute value of the temperature change of the magnetocaloric material when the magnetic field is applied (the adiabatic temperature change, Delta-$T_{ad}$).

The time that it takes to complete execution of the four stages of the AMR cycle is called the cycle time, and its inverse is known as the cycle frequency. The temperature span of the MR system is defined as $T_{Hi}$-$T_{Ci}$, which is the difference in the inlet fluid temperatures. The AMR cycle is analogous to a vapor compression cycle, where gas compression (which causes the gas to heat) plays the role of magnetization, and where free expansion of the gas (which drops the gas temperature) plays the role of demagnetization. In the vapor compression cycle, the heat transfer fluid changes phase in the CHEX and HHEX to aid in heat transfer. No such phase change need occur in the CHEX and HHEX of the AMR cycle, but a fluid with a high single phase heat transfer coefficient, such as water, may be used. Although FIGS. 1a to 1d illustrate the operation of a single-bed MR system, in alternative embodiments, multiple beds, each undergoing the same AMR cycle, may be combined in a single system to increase the cooling power, reduce the system size, or otherwise improve the implementation of the AMR cycle.

Figure 2B:
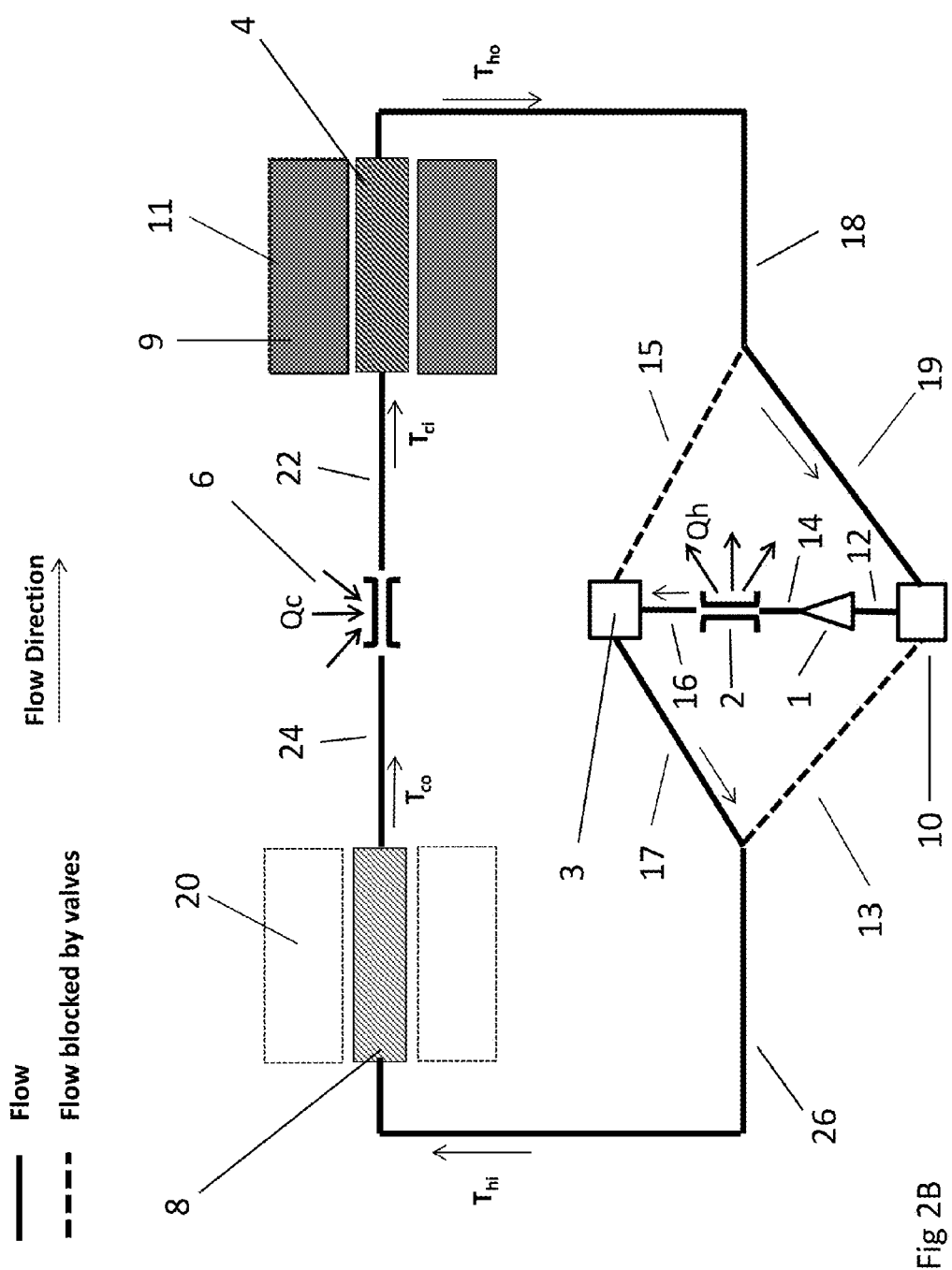
FIG. 2B is a diagram illustrating AMR mode operation in a two bed magnetic refrigeration system with a magnet that is in periodic motion and in a second position.

FIGS. 2a and 2b show an illustrative embodiment of the AMR cycle with two AMR beds. It is also assumed in FIGS. 2a and 2b that the temperature of the MCM is near a paramagnetic to ferromagnetic transition, in which case the MCM will warm when a magnetic field is applied, and cool when the magnetic field is removed. It is also possible to use a MCM at a temperature near an antiferromagnetic transition, in which case the AMR cycle will operate in a similar manner, but the MCM will cool when a magnetic field is applied, and warm when the magnetic field is removed.

In FIG. 2a, a pump 1 drives heat transfer fluid (HTF) at a hot outlet temperature $T_{ho}$ through a hot side heat exchanger (HHEX) 2, where the HTF releases heat to an environment and cools to a hot inlet temperature $T_{hi}$. The HTF enters a hot inlet valve 3. The hot inlet valve 3 directs the HTF through pipes 15 and 18 to the hot end of a porous bed of magnetocaloric material (MCM) 4 that is in a demagnetized state next to a position 11 outside a magnet 9. The HTF is cooled as it flows through the MCM bed 4 to a cold outlet temperature $T_{co}$ and is directed through pipe 22 to a cold side heat exchanger (CHEX) 6 where the HTF absorbs heat from the load, warming it to a cold inlet temperature $T_{ci}$. The fluid is directed through pipe 24 to the cold end of a porous bed of MCM 8 that is inside the magnet 9 in a magnetized state. The MCM bed 8 is in a magnetized state next to a position 20, which is currently occupied by the magnet 9. The HTF is warmed as it flows through the MCM bed 8 to a temperature $T_{ho}$ and is directed through pipes 26 and 13 to a hot outlet valve 10, completing a fluid cycle. After a period of time, $T_b$, the magnet 9 is removed from MCM bed 8 and the position 20 and moved over to MCM bed 4 and into the position 11, and the valves 10 and 3 are switched, producing the situation shown in FIG. 2b. Again, the pump 1 drives heat transfer fluid (HTF) at a temperature $T_{ho}$ through the HHEX 2, where the HTF releases heat to an environment and cools to a temperature $T_{hi}$. The HTF enters the hot inlet valve 3. The hot inlet valve 3 directs the HTF through pipes 17 and 26 to the hot end of the MCM bed 8 that is in a demagnetized state next to the position 20 outside the magnet 9. The HTF is cooled as it flows through the MCM bed 8 to a temperature $T_{co}$ and is directed through pipe 24 to the CHEX 6 where the HTF absorbs heat from the load, warming it to a temperature $T_{ci}$. The HTF is then directed through pipe 22 to the cold end of the MCM bed 4 that is in a magnetized state inside the magnet 9, which is currently occupying the position 11. The HTF is warmed as it flows through the MCM bed 4 to a temperature $T_{ho}$ and is directed through pipes 18 and 19 to the hot outlet valve 10, completing a fluid cycle. After a period of time $T_b$, the magnet 9 is again removed from the position 11 and the MCM bed 4 and returned to the position 20 and the MCM bed 8, and the valves 10 and 3 are switched, again producing the situation shown in FIG. 2a.

The two flow periods depicted in FIGS. 2a and 2b, together with the switching of the valves and the movement of the magnet 9 from the MCM bed 8 to the MCM bed 4, and back again to the MCM bed 8, constitute one AMR cycle.

Efficient operation of the AMR cycle as a refrigerator transporting heat over a substantial temperature span requires that the flows in the two directions are balanced throughout the MCM material, that is, the total cold to hot flow in a cycle is the same magnitude as the subsequent total hot to cold flow. The MCM, which is usually in the form of a bed porous to fluid flow (the AMR bed), must be subjected to a large change in magnetic field to produce a substantial magnetocaloric effect. The large magnetic field can be generated by one or more expensive high field magnets. Any HEX that connects with the magnetized beds should be located outside the magnet air gap in order to not consume much of the high magnetic field region. The HEX can then be linked by a length of piping to the AMR bed. Practical considerations about the location of the heat source and sink with respect to the AMR may involve very long piping runs. An example is the air conditioner of a large building, where the HHEX may be on the roof of the building, and multiple CHEX's may be located throughout the building.

A useful parameter for describing the fluid flow in an AMR-type magnetic refrigerator is the utilization ratio, which is the ratio of the thermal capacity of the fluid that flows through an AMR bed in one half cycle to the thermal capacity of the MCM in the AMR bed. For fluid mass flow rate f, flow time in a half cycle T, MCM mass m, MCM average specific heat capacity $C_{pm}$, fluid specific heat capacity $C_{pf}$, the utilization ratio is:

$$U=(f\, T\, C_{pf})/(m\, C_{pb}) \quad \text{Equation 1}$$

If the utilization ratio is much larger than 2, then the AMR bed, acting as a regenerator, will be unable to support a large temperature span. Conversely, if the utilization ratio is much less than 0.1, then the cooling load per cycle will be relatively low, and frictional losses associated with changing the magnetic field and reversing the flow will use up much of the potential cooling load of the AMR bed.

If a low density gaseous heat transfer fluid is used, the volume of fluid moved through the AMR bed(s) in one half cycle (the swept volume) can be much larger than the volume of the AMR bed(s) at suitable utilization factors because the volumetric heat capacity of the low density gaseous heat transfer fluid is much less than that of the solid magnetocaloric material. If a substantial cooling power is required, the flow losses in moving the required high volume of heat transfer fluid through the AMR bed will be large, greatly reducing the efficiency of the AMR. A solution to this problem is to use a liquid heat transfer fluid with a high volumetric heat capacity, such as water. However, in this case the swept volume at suitable utilization factors will become the same order as the volume of the AMR bed, and also the same order as the volume of the piping that connect the AMR beds to the HEXs.

When the swept volume is not much larger than the volume of the piping, and a single pipe with bidirectional flow links a HEX to a AMR bed, much of the fluid that flows in the pipe will not see substantial exposure to both the HEX and the AMR bed, and thus will not effectively transfer heat between the AMR bed and the HEX. This type of loss is commonly called a shuttle loss or a dead volume loss. For example, if the swept volume is less than the volume of pipe 24 in FIG. 2a, the fluid initially in CHEX 6 when bed 8 is magnetized will not reach bed 8 by the end of the fluid flow period, and thus not transfer heat to the bed 8. A method to reduce the adverse impact of the piping dead volume is discussed in U.S. Pat. No. 5,934,078 (Reciprocating active magnetic regenerator refrigeration apparatus) and in a paper on a device based on the patent (C. Zimm, A. Jastrab, A. Sternberg, V. Pecharsky, K. Gschneidner, Jr., M. Osborne, and I. Anderson, "Description and Performance of a Near-Room Temperature Magnetic Refrigerator", Advances in Cryogenic Engineering, 43, pp. 1759-1766 (1998), hereafter Zimm, Jastrab, et al). Further refinement on the concept was described in U.S. Pat. No. 6,526,759, (Rotating bed magnetic refrigeration apparatus) and in a paper on a device based on the patent (C. Zimm, A. Boeder, J. Chell, A. Sternberg, A. Fujita, S. Fujieda, and K. Fukamichi, "Design and Performance of a Permanent Magnet Rotary Refrigerator", International Journal of Refrigeration, Vol. 29, pp. 1302-1306 (2006), hereafter Zimm, Boeder et al). The method is to provide two pipes between one end of an AMR bed and a HEX, and use valves or other components to cause fluid in the first pipe to only flow in a single direction from the HEX outlet to the AMR bed, and fluid in the second pipe to only flow in a single direction from the AMR bed to the HEX inlet. In this unidirectional pipe flow case, all the fluid that passes though the HEX will eventually also pass through the first pipe and reach the AMR bed, and all the fluid that exits the AMR bed en-route to the HEX will pass through the second pipe and the HEX.

Figure 3A:
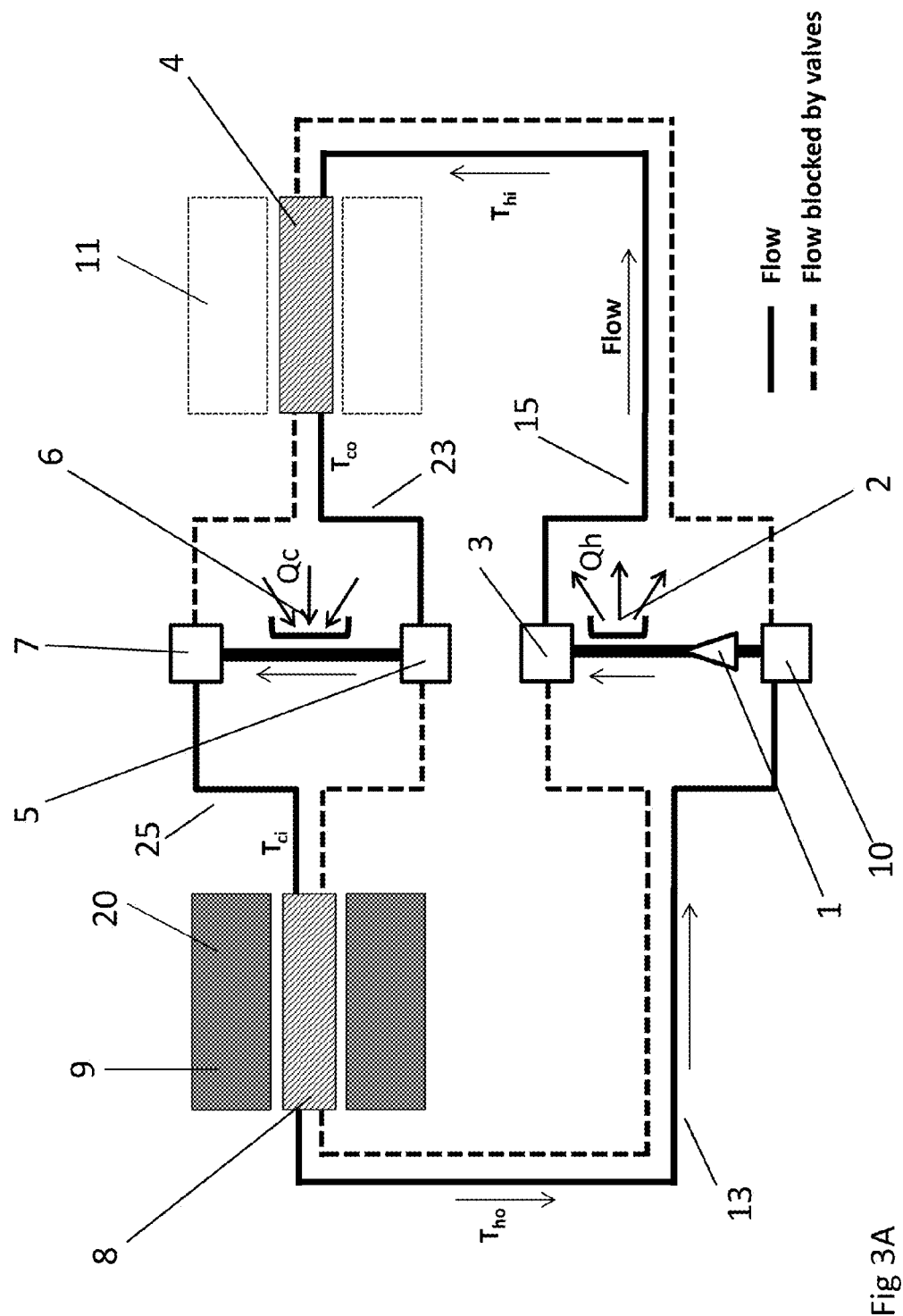
FIG. 3A is a diagram illustrating AMR mode operation in a two bed magnetic refrigeration system with unidirectional flow in the piping and with a magnet that is in periodic motion and in a first position in accordance with an illustrative embodiment.
Figure 3B:
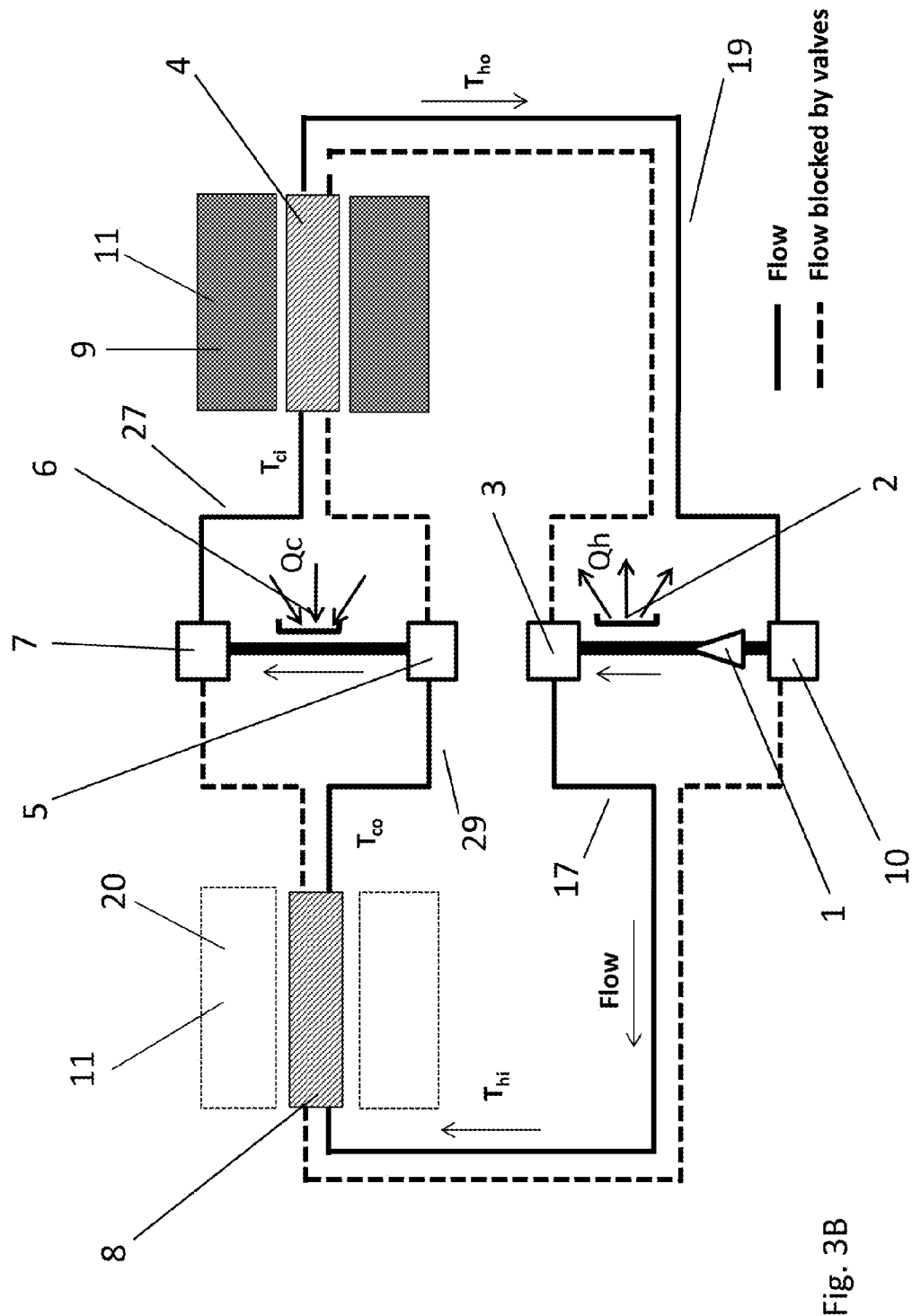
FIG. 3B is a diagram illustrating AMR mode operation in a two bed magnetic refrigeration system with unidirectional flow in the piping and with a magnet that is in periodic motion and in a second position in accordance with an illustrative embodiment.

FIGS. 3a and 3b show an illustrative embodiment of the AMR cycle with two AMR beds and unidirectional flow in the piping. In FIG. 3a, a pump 1 drives heat transfer fluid (HTF) at a hot outlet temperature $T_{ho}$ through a hot side heat exchanger (HHEX) 2, where the HTF releases heat to an environment and cools to a hot inlet temperature $T_{hi}$. The HTF enters a hot inlet valve 3. The hot inlet valve 3 directs the HTF through pipe 15 to the hot end of a porous bed of magnetocaloric material (MCM) 4 that is in a demagnetized state next to a position 11 outside a magnet 9. The HTF is cooled as it flows through the MCM bed 4 to a cold outlet temperature $T_{co}$ and is directed through pipe 23 to a cold outlet valve 5. The cold outlet valve 5 directs the HTF to a cold side heat exchanger (CHEX) 6 where the HTF absorbs heat from the load, warming it to a cold inlet temperature $T_{ci}$. The fluid enters a cold inlet valve 7 and is directed through pipe 25 to the cold end of a porous bed of MCM 8 that is inside the magnet 9 in a magnetized state. The MCM bed 8 is in a magnetized state next to a position 20, which is currently occupied by the magnet 9. The HTF is warmed as it flows through the MCM bed 8 to a temperature $T_{ho}$ and is directed through pipe 13 to a hot outlet valve 10, completing a fluid cycle. After a period of time, $T_b$, the magnet 9 is removed from MCM bed 8 and the position 20 and moved over to MCM bed 4 and into the position 11, and the valves 10, 3, 5 and 7 are switched, producing the situation shown in FIG. 3b. Again, the pump 1 drives heat transfer fluid (HTF) at a temperature $T_{ho}$ through the HHEX 2, where the HTF releases heat to an environment and cools to a temperature $T_{hi}$. The HTF enters the hot inlet valve 3. The hot inlet valve 3 directs the HTF through pipe 17 to the hot end of the MCM bed 8 that is in a demagnetized state next to the position 20 outside the magnet 9. The HTF is cooled as it flows through the MCM bed 8 to a temperature $T_{co}$ and is directed through pipe 29 to a cold outlet valve 5. The cold outlet valve 5 directs the HTF to the CHEX 6 where the HTF absorbs heat from the load, warming it to a temperature $T_{ci}$. The HTF enters the cold inlet valve 7 and is directed through pipe 27 to the cold end of the MCM bed 4 that is in a magnetized state inside the magnet 9, which is currently occupying the position 11. The HTF 15 warmed as it flows through the MCM bed 4 to a temperature $T_{ho}$ and is directed through pipe 19 to the hot outlet valve 10, completing a fluid cycle. After a period of time $T_b$, the magnet 9 is again removed from the position 11 and the MCM bed 4 and returned to the position 20 and the MCM bed 8, and the valves 10 and 3 are switched, again producing the situation shown in FIG. 3a. For each of the pipes 13, 15, 17, 19, 23, 25, 27 and 29 illustrated in FIGS. 3a and 3b, flow occurs in only one direction.

A transition region occurs between the unidirectional flow in the piping from the heat exchanger to the bed, and the bidirectional flow in the AMR bed. In U.S. Pat. No. 5,934, 078, the unidirectional piping from the heat exchangers consisted of four sections having a central lumen at the inner radius of an annular bed (FIGS. 4 and 6 of U.S. Pat. No. 5,934,078). The transition from unidirectional flow to bi-directional flow occurred just outside the AMR bed. This arrangement had low dead volume, but most of the flow from the cold HEX entered the bed at a different location from the flow that later exited the bed to go to the cold HEX. Similarly most of the flow from the hot HEX entered the bed at a different location from the flow that later exited the bed to go to the hot HEX. The result is that portions of the AMR bed near the inlet and exit ports were exposed to flow in only one direction. The regions of the AMR bed subjected to flow in only one direction did not correctly undergo the AMR cycle, and thus did not contribute to the cooling power of the device. A second problem was that the unidirectional flow in each direction near the ends of the bed was concentrated in only part of the region near the end of the bed, and thus flowed at a higher flow rate per unit cross sectional area, and thus produced a much higher pressure drop loss, reducing the efficiency of the device.

In U.S. Pat. No. 6,526,759, a distribution region for flow was added to the transition region between a pair of unidirectional cold flow pipes and the cold end of the beds (item 41 of FIG. 2 of U.S. Pat. No. 6,526,759). The introduction of the flow distribution region, hereafter called a plenum, ensures that the entrance region of the bed that receives fluid from the cold HEX is the same as the exit region of the bed that supplies fluid to the cold HEX. This arrangement allows for bidirectional flow throughout the AMR bed, and reduces pressure drop in the end regions of the bed, but creates a dead volume in the plenum of the device.

The approaches to solving the dead volume problem shown in U.S. Pat. Nos. 5,934,078 and 6,526,759 traded off the size of the dead volume against the size of the region of the AMR bed that suffers unidirectional flow. In both of the early devices described in these patents, the total flow path inside each AMR bed was relatively long: 10 cm for device described in U.S. Pat. No. 5,934,078, and 6 cm for the device described in U.S. Pat. No. 6,526,759. In both cases, the length of the flow path in the beds was larger than the width of the beds. The ratio of the length of the flow path in the beds to the width of the beds, the aspect ratio, was greater than 2 for both devices. Thus the size of the regions of unidirectional flow inside the beds or the size of the plenum at the entrance of the beds could be relatively small in these past devices. Obtaining more cost effective AMR devices with higher cooling power per unit mass of magnetocaloric material (higher specific cooling power) will involve higher flow rates and shorter flow paths in the AMR beds, which will make the adverse effects of both dead volume and unidirectional flow regions in the AMR beds more severe. Thus the previous methods may not be adequate for future high specific cooling power AMR devices.

Figure 4:
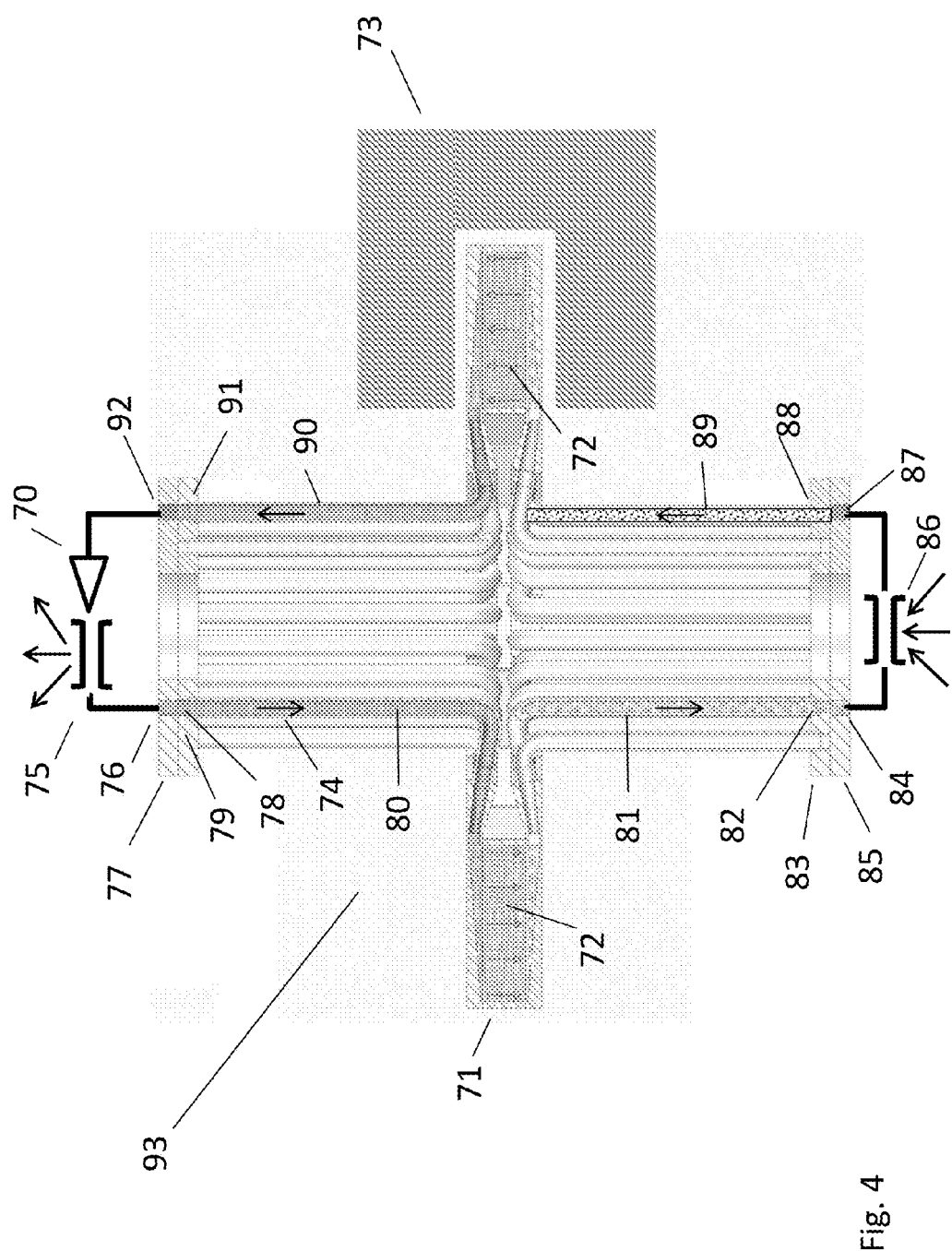
FIG. 4 is a diagram illustrating a rotating bed active magnetic regenerator refrigerator in which the fluid flow is controlled by valves activated by the rotation of the bed wheel in accordance with an illustrative embodiment.

In an illustrative example, FIG. 4 shows an embodiment of the AMR cycle where the beds of MCM material are arranged in a wheel assembly that is rotated through a magnetic field. A magnetic refrigerator 93 includes rotating beds 71 containing magnetocaloric material 72. As the beds 71 rotate into the gap of a magnet 73, a magnetic field is applied. A pump 70 drives the flow of heat transfer fluid 74 through a hot heat exchanger 75 and into an inner slot 76 on a hot stator disc 77. The fluid then passes through a set of inner holes 78 in a rotating hot disc 79 into hot fluid inlet pipes 80 that carry the fluid to the portion of the beds 71 that are outside the magnet 73 and at a low magnetic field. The fluid is cooled as it passes through the portion of the magnetocaloric material 72 that is at low magnetic field, and then exits the beds through cold outlet pipes 81 that carry fluid to inner holes 82 in a rotating cold disc 83. The fluid then passes through an inner slot 84 in a cold stator disc 85 and flows through a cold heat exchanger 86 to an outer slot 87 in the cold stator disc 85. The fluid then flows through outer holes 88 in the cold rotating disc 83 to cold inlet pipes 89 that carry the fluid to the portion of the beds 71 that are in the magnet 73 at high magnetic field. The fluid is warmed as it passes through the portion of the magnetocaloric material 72 that is at high magnetic field, and then exits the beds through hot outlet pipes 90 that carry fluid to outer holes 91 in the rotating hot disc 79. The fluid then passes through an outer slot 92 in the hot stator disc 77 and flows to the pump 70.

The periodic reversal of flow though the beds in synchrony with the change in magnetic field is what enables the heat pumping ability of the AMR cycle. The flow from the cold-to-hot sides of a bed in the presence of the field drives heat to a HHEX, while the flow from the hot-to-cold sides of a bed in the absence of the field removes heat from a CHEX. The change in magnetic field is provided by a magnet, whose mass is proportional to the volume of the region of high magnetic field that it must provide (reference S. L. Russek and C. B. Zimm, Potential for cost effective magnetocaloric air conditioning systems, International Journal of Refrigeration, Volume 29, Issue 8, December 2006, Pages 1366-1373, (hereinafter "Russek et al.")). The projected cost of an AMR-type magnetic refrigerator is dominated by the magnet, whose cost is proportional to its mass (Russek et al). The AMR beds pass though the high field region of the magnet in order to undergo the AMR cycle. However, in order the minimize the volume of the high field region and the cost of the magnet, it is advantageous to locate the CHEX and HHEX outside the region of high magnetic field. If the heat exchangers are located outside of the magnetic field and the beds pass through the magnetic field, piping is employed to carry fluid between the beds and the HEX's. For example, in FIG. 4, the pipes 80, 81, 89 and 90 are provided to carry fluid between the magnetocaloric beds and the HEX's.

Figure 5:
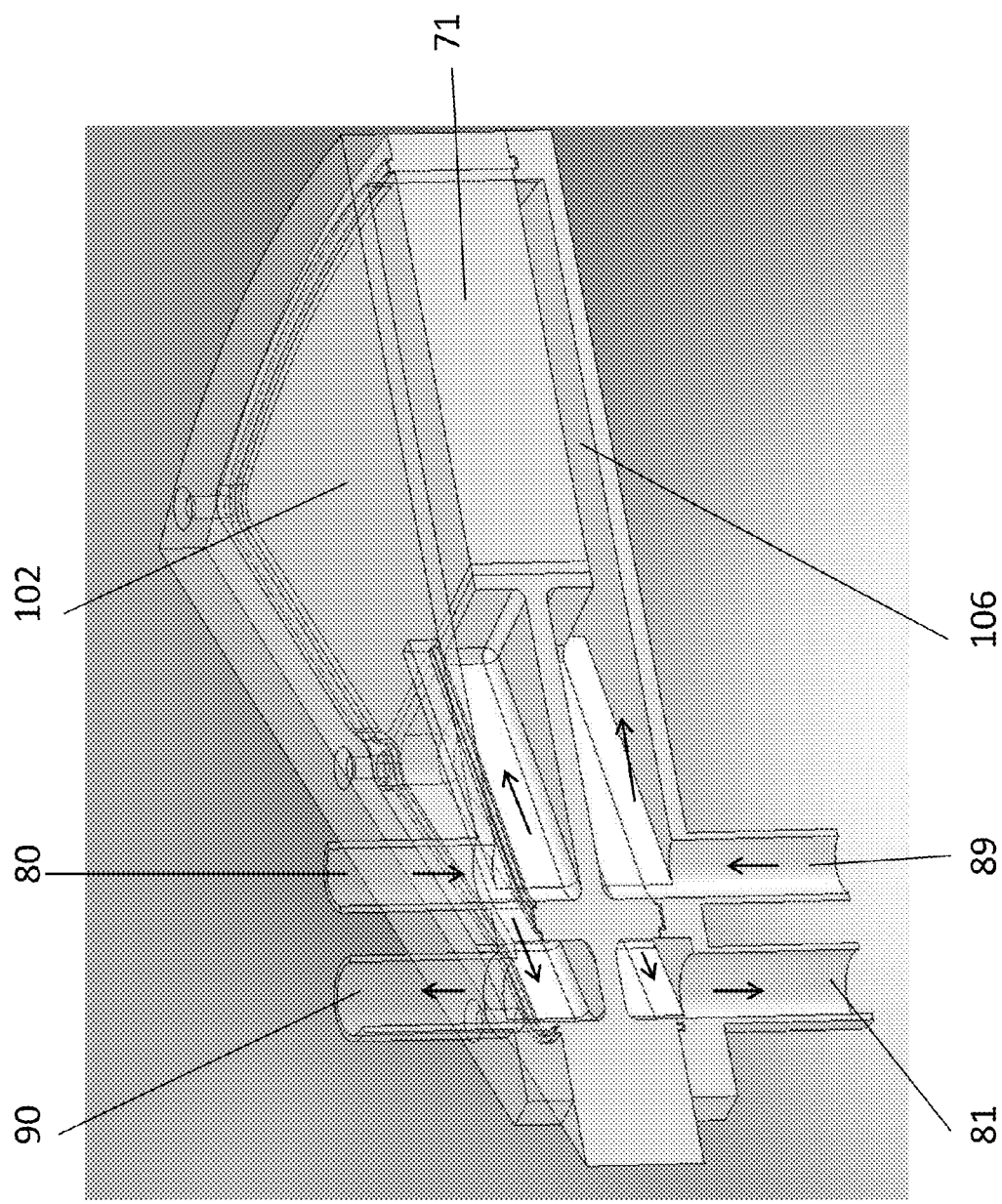
FIG. 5 shows an AMR bed with a plenum region at each end, with each plenum carrying both inlet and outlet flows in accordance with an illustrative embodiment.

FIG. 5 shows additional detail of the MCM beds and associated piping of an embodiment of the AMR cycle of a configuration similar to that of FIG. 4. A hot inlet pipe 80 comes down from above and terminates in a top plenum 102 connecting to the top side of an AMR bed 71. In one embodiment, the AMR bed 71 has a mean aspect ratio (flow length divided by width) of less than 0.2. A hot outlet pipe 90 also connects to and rises from the top plenum. A cold inlet pipe 89 rises from below and terminates in a bottom plenum 106 connecting to the bottom side of the AMR bed 71. A cold outlet pipe 81 is also connected to the bottom plenum 106 and drops down from the bottom plenum 106. If the top plenum 102 and the bottom plenum 106 have enough depth, the inlet flow from the pipe 80 and outlet flow from the pipe 81 will distribute over the entire top and bottom faces of the AMR bed 71 during the period of hot to cold flow, and thus the AMR bed 71 will experience fairly uniform hot to cold flow. Similarly, when the flow reverses, the flow from pipe 89 and 90 will distribute over the entire bottom and top faces of the AMR bed, and thus AMR bed 71 will experience fairly uniform cold to hot flow. However, the fluid left in the bottom plenum 106 at the end of the hot to cold flow will not pass through the cold HEX and absorb heat. Instead, the fluid will either be directly pushed up into the AMR bed 71 during the cold to hot flow, or be mixed with fluid leaving the cold HEX and then be pushed up to the AMR bed 71. Similarly, the fluid left in the top plenum 102 at the end of the cold to hot flow will not pass through the hot HEX. Instead, the fluid will be pushed down into the AMR bed 71 during the hot to cold flow, or be mixed with fluid leaving the hot HEX and then be pushed down to the AMR bed 71. This dead volume effect will reduce the refrigeration power, or temperature span, or efficiency of the AMR system, depending on what system parameters are adjusted to compensate for the dead volume effect. The dead volume region will be relatively high compared to the swept volume when the aspect ratio of the bed is low, as is the case for the assembly in FIG. 5, and thus the dead volume effect severely affects performance of low aspect ratio AMR systems.

Figure 6:
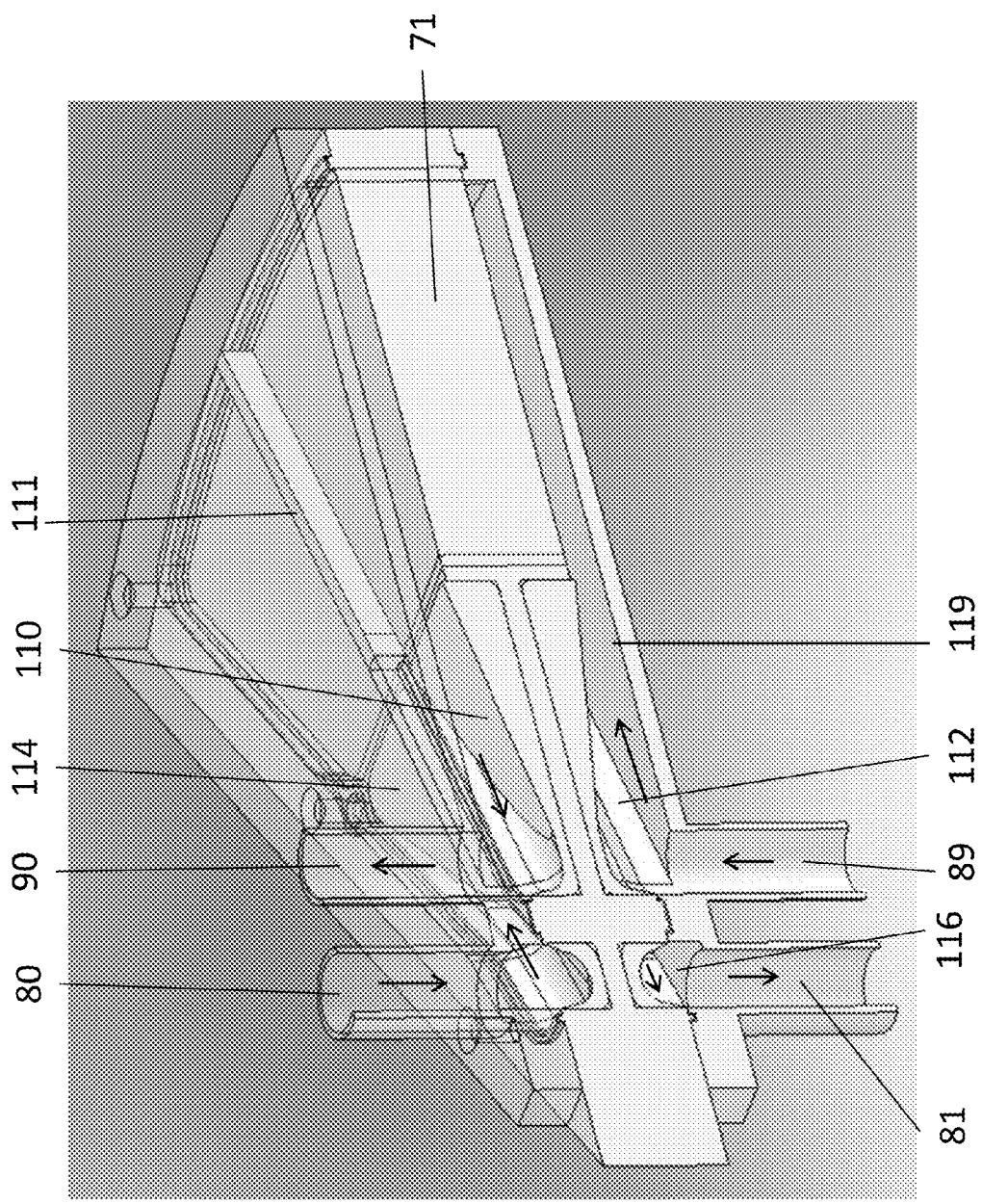
FIG. 6 shows an AMR bed with flow dividers to ensure separation of inlet and outlet flows in accordance with an illustrative embodiment.

FIG. 6 is a similar geometry to FIG. 5, but barrier pieces 111 and 112 are inserted into what had been the top and bottom plenums dividing each of the plenums into two separate channels. A hot inlet pipe 80 comes down from above and terminates in a hot inlet channel 114 connecting to the top left side of an AMR bed 71. A cold outlet channel 116 connects to the bottom left side of the AMR bed 71 and also connects to a cold outlet pipe 81 below the cold outlet channel 116. A cold inlet pipe 89 rises from below and terminates in a cold inlet channel 119 connecting to the bottom right side of the AMR bed 71. A hot outlet channel 110 connects to the top right side of the AMR bed 71 and also connects to a hot outlet pipe 90 that rises from the hot outlet channel 110.

Figure 7:
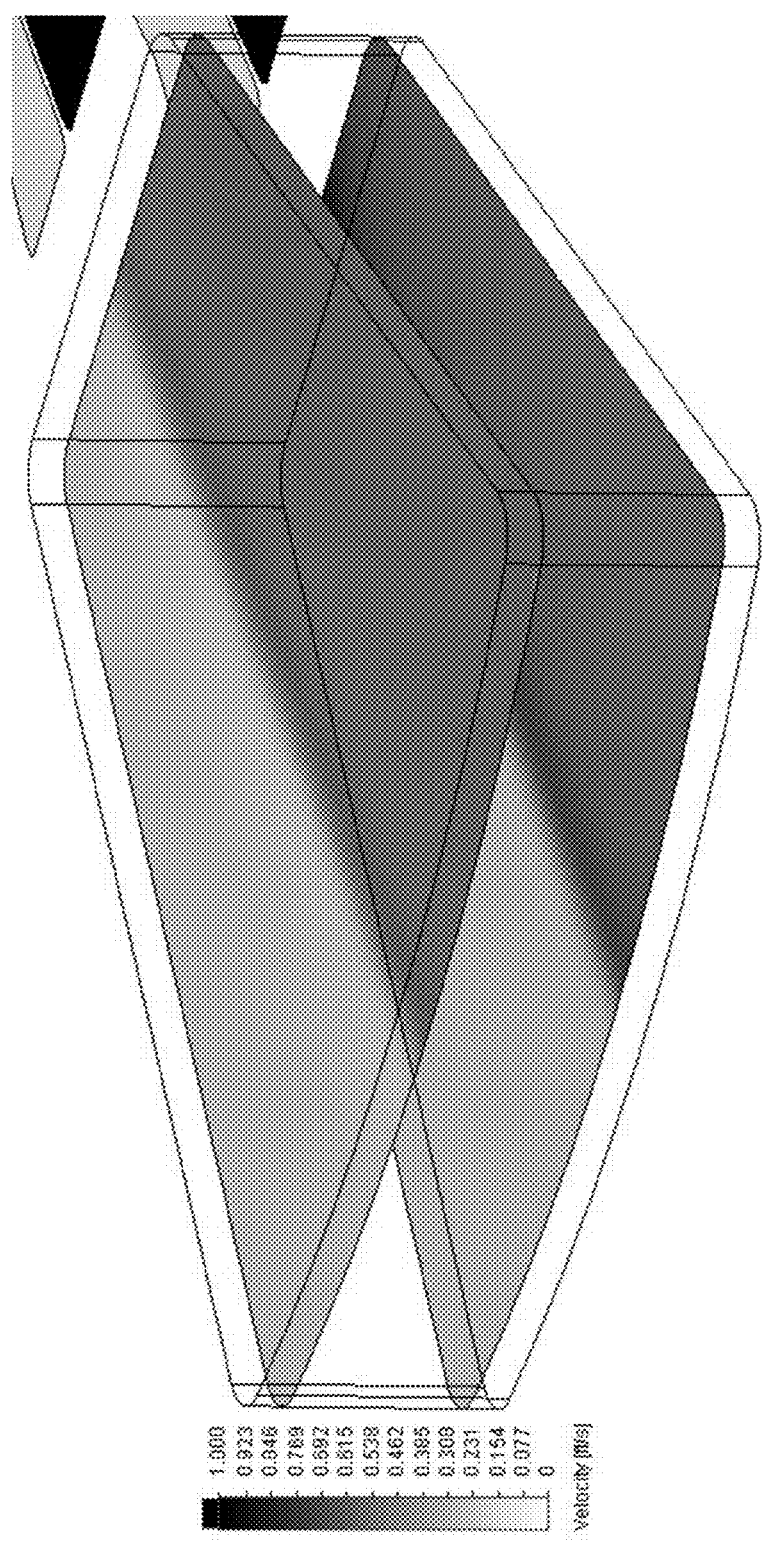
FIG. 7 shows the results of a simulation of the flow in the AMR bed of FIG. 6 in accordance with an illustrative embodiment.

A finite element fluid flow model was constructed from the geometry of FIG. 6, and the fluid flow that should occur according to the Navier-Stokes equations for an incompressible fluid with the viscosity and density of water was determined. FIG. 7 shows the results of the computation for the case of flow entering the cold inlet pipe on the bottom right side, flowing through an AMR bed of 14 mm height, and exiting the hot outlet pipe on the top right side. The intensity of the flow crossing two planes inside the bed are shown, one plane 2 mm below the top of the bed, the other 2 mm above the bottom of the bed. In alternative embodiments, different dimensions may be used. By dividing the top and bottom plenums into inlet and outlet regions, the dead volume effect is greatly reduced. However, upon examining the intensity of flow inside the bed in FIG. 7, it is clear that the right side of the bed sees most of the cold to hot flow, and, correspondingly on the next half cycle, the left side of the bed will see most of the hot to cold flow. The portions of the bed which are not close to the center plane that runs through the barrier pieces 111 and 112 of FIG. 6 do not see the correct balanced bi-directional flow required to execute the AMR cycle. This effect is most severe when the length of the bed is less than the width of the bed, and will result in a large reduction in the performance (cooling power, or temperature span, or efficiency, depending on what system parameters are adjusted to compensate) of the AMR system incorporating the bed. In addition, the regions near the inlets and outlets that show flow in only one direction also see higher peak flows because the flow is concentrated over a smaller area, and thus will suffer higher pressure drop.

Figure 8:
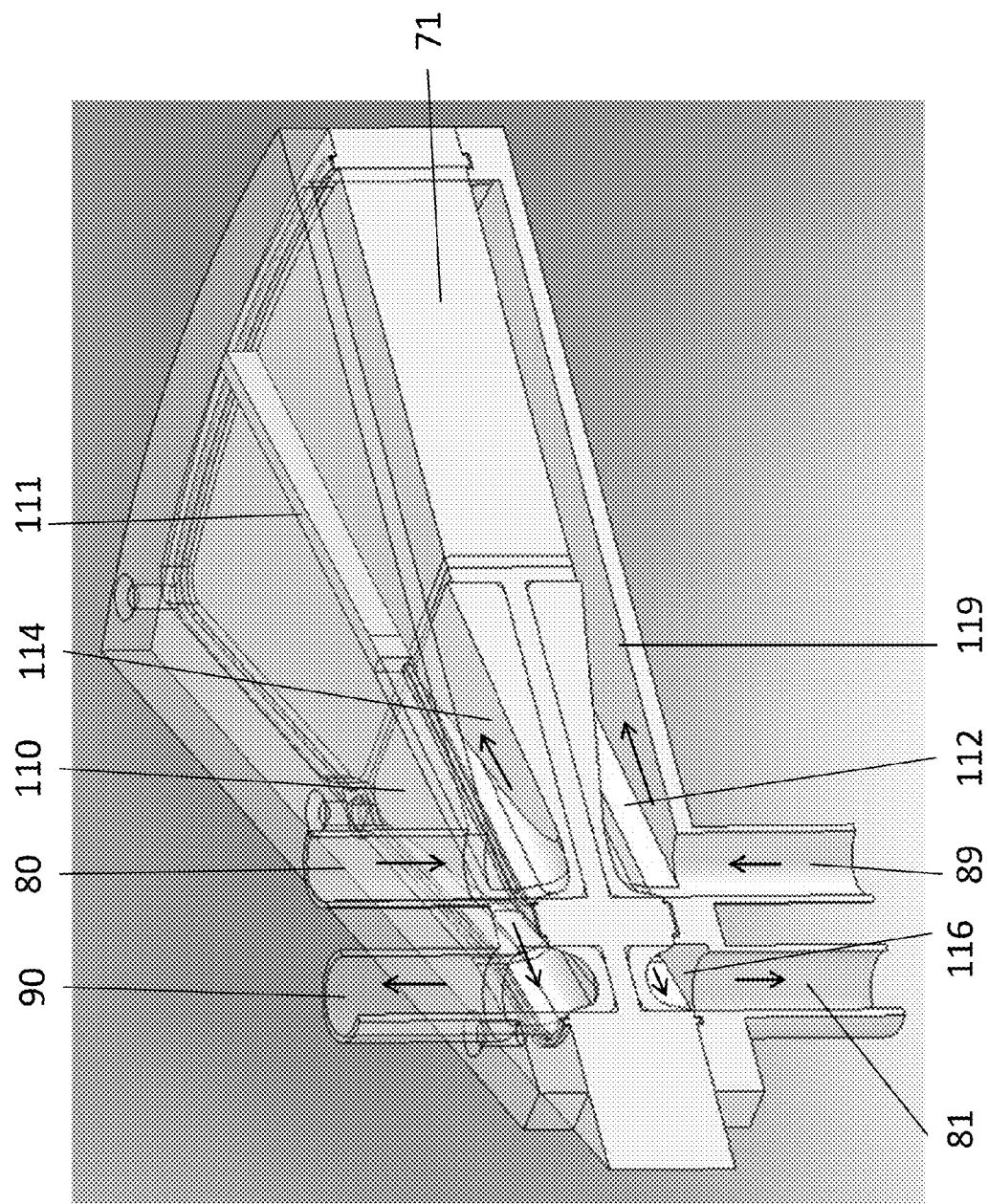
FIG. 8 shows an AMR bed with flow dividers and staggered inlets and outlets in accordance with an illustrative embodiment.

FIG. 8 is also a similar geometry to FIG. 5, with barrier pieces 111 and 112 inserted into what had been the top and bottom plenums dividing each of the plenums into two separate channels. In this case, the inlets and outlets are staggered to opposite sides of the bed. A hot inlet pipe 80 comes down from above and terminates in a hot inlet channel 114 connecting to the top right side of an AMR bed 71. A cold outlet channel 116 connects to the bottom left side of the AMR bed 71 and also connects to a cold outlet pipe 81 below the cold outlet channel 116. A cold inlet pipe 89 rises from below and terminates in a cold inlet channel 119 connecting to the bottom right side of the AMR bed 71. A hot outlet channel 110 connects to the top left side of the AMR bed 71 and also connects to a hot outlet pipe 90 that rises from the hot outlet channel 110.

Figure 9:
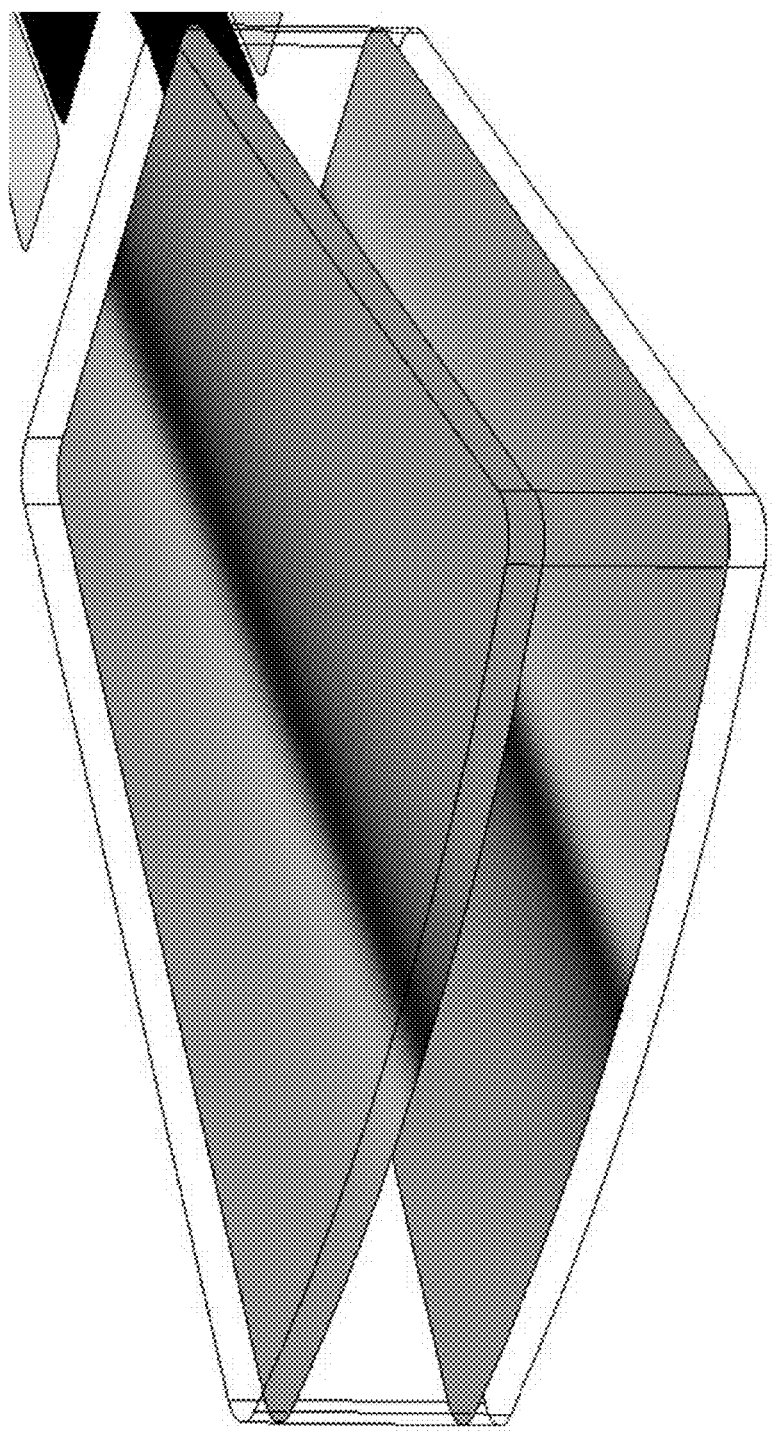
FIG. 9 shows the results of a simulation of the flow in the AMR bed of FIG. 8 in accordance with an illustrative embodiment.

A finite element fluid flow model was constructed from the geometry of FIG. 8, and the fluid flow that should occur according to the Navier-Stokes equations for an incompressible fluid with the viscosity and density of water was determined. FIG. 9 shows the results of the computation for a bed of height 14 mm for two horizontal planes, one 2 mm from the top, and the other 2 mm from the bottom, for the case of flow entering the hot inlet pipe on the top right, flowing through the AMR bed, and exiting the cold outlet pipe on the bottom left. In alternative embodiments, different dimensions may be used.

In comparing the regions of flow in FIGS. 7 and 9, it is clear that the staggering of the inlet and outlet regions to opposite sides of the bed increases the region that undergoes correctly balanced AMR flow, which will increase the performance of the bed over that of the un-staggered case. However, significant flow non-uniformities still occur, with regions of the bed near to the barrier pieces 111 and 122 of the bed in FIG. 8 showing more flow in FIG. 9 than the regions near the top left side and bottom right side of the bed. When the flow occurs in the reverse direction, similar flow excess will appear in the bed near to the barrier pieces 111 and 122, and a flow deficiency will appear on the top right side and bottom left side of the bed. Those regions of the bed that show flow in substantially only one direction will not properly execute the AMR cycle, and thus will have reduced contribution to the performance of the device. In addition, the regions near the inlets and outlets of the bed that show higher peak flows concentrated over a smaller area will suffer higher pressure drop. However, the separation of inlet and outlet flows by the barrier pieces 111 and 112 does substantially reduce dead volume effects. Most of the flow that enters the inlet channels came from a HEX, and will subsequently enter the AMR bed. Most of the flow that leaves the AMR bed to an outlet channel will subsequently reach a HEX.

Figure 10:
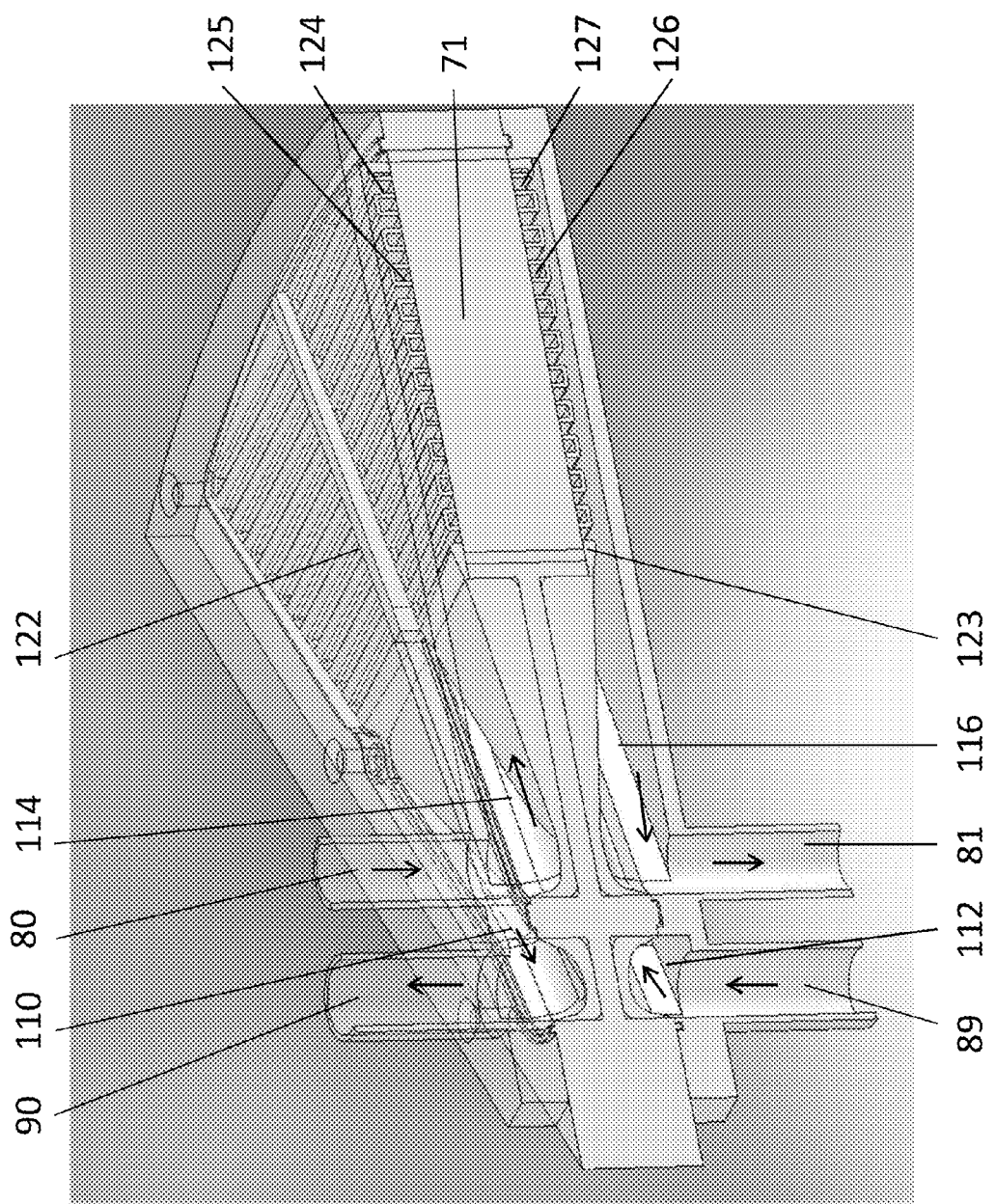
FIG. 10 shows an AMR bed with flow dividers, in which each inlet and outlet is divided into eleven sub-passages that interleave to more uniformly distribute the flow in accordance with an illustrative embodiment.

FIG. 10 shows a flow arrangement that is similar to that of FIGS. 5, 6, and 8, but each inlet and outlet channel divides into sub-passages and connects to the AMR bed 71 in eleven separate slots. In alternative embodiments, a different number of slots may be used. The separation and distribution of flow is accomplished by flow inserts 122, 123 that are substituted for the barrier pieces that had been used in FIGS. 6 and 8. The eleven inlet slots 124 and eleven outlet slots 125 on the top of the AMR bed 71 interleave, and the eleven inlet slots 126 and eleven outlet slots 127 on the bottom of the bed 71 also interleave. Each slot extends over both the right and left sides of the bed 71. A hot inlet pipe 80 comes down from above and terminates in a hot inlet channel 114 extending over the right portion of the AMR bed 71 and connecting to eleven slots 124 that connect to the top right side of an AMR bed 71 through the lower wall of the inlet channel 114 and to the left side of the AMR bed 71 through continuation of the slots under a hot outlet channel 110. A cold outlet channel 116 connects via eleven slots 127 to the bottom right portion of the AMR bed 71 through the upper wall of the outlet channel 116 and to the left side of the AMR bed 71 through continuation of the slots under a cold inlet channel 112 and also connects to a cold outlet pipe 81 below the cold outlet channel 116. A cold inlet pipe 89 rises from below and terminates in the cold inlet channel 112 extending under the left portion of the AMR bed 71 and connecting to the bottom left portion of the AMR bed 71 via eleven slots 126 in the upper wall of the channel 112 and connecting to the bottom right portion of the AMR bed 71 through continuation of the slots under the cold outlet channel 116. The hot outlet channel 110 connects to the top left sides of the AMR bed 71 via eleven slots 125 cut in the lower wall of the channel 110 and to the top right side of the AMR bed 71 through continuation of the slots 125 under the hot inlet channel 114 and also connects to a hot outlet pipe 90 that rises from the hot outlet channel 110.

A finite element fluid flow model was constructed from a geometry with a interleaved slot configuration similar to that of FIG. 10, and the fluid flow that should occur according to the Navier Stokes equations for an incompressible fluid with the viscosity and density of water was determined. FIG. 11 shows the results of the computation of the intensity of the flow crossing two horizontal planes, one 2 mm from the top, and the other 2 mm from the bottom of the bed, for the case corresponding to flow entering the hot inlet pipe (80 in FIG. 10), flowing through the AMR bed 71 of length 14 mm, and exiting the cold outlet pipe 81.

For the case of FIG. 11, it would be expected that the regions of the bed very near to the multiple cold inlet slots or the multiple hot outlet slots would see slightly greater flow in only one direction, namely from hot to cold. However, the amount of flow variation has already decayed to a very small difference in the 2 mm distance between the ends of the bed and the planes showing the flow. The loss of performance from regions of the bed that show flow in substantially only one direction will be very small because these regions are of very small volume. In addition, there will be very little increase in pressure drop because the regions of concentrated flow near the inlet and outlet slots are very limited in depth. Moreover, the separation of inlet and outlet flows by flow insert pieces 122 and 123 reduces dead volume effects. Most of the flow that enters the inlet slots came from a HEX, and will subsequently enter the AMR bed. Most of the flow that leaves the AMR bed to an outlet slot will subsequently reach a HEX.

An AMR type magnetic refrigerator with 12 AMR beds was constructed using the configuration shown in FIG. 4, with AMR bed inlet and outlet geometry shown in FIG. 5. Flow in the piping between the CHEX and HHEX was substantially unidirectional, but the inlet and outlet flows could mix in the upper and lower plena 102 and 106 shown in FIG. 5. At a fluid flow rate of 15 liters per minute, the refrigerator produced a cooling power of 499.8 watts at a span of 24.2C. Flow dividers were then inserted into the plena 102 and 106 to produce the inlet and outlet geometry shown in FIG. 10. The flow inserts 122 and 123 were designed to separate inlet and outlet flow. At the same fluid flow rate of 15 liters per minute, and substantially the same temperature span of 24.4 C, the cooling power increased by 22% to 611.7 watts.

FIG. 10 shows an example of inlet and outlet pipes near an AMR bed that divide into two or more interleaved sub-passages with separation of inlet and outlet flows. The separation of inlet and outlet flows prevents dead volume losses, and the multiple interleaved sub-passages allow for better flow distribution in the AMR bed by minimizing the regions of concentrated or unidirectional flow. There are multiple ways of configuring the inlet and outlet geometries to accomplish the proper flow separation and the proper flow distribution. Other examples are discussed in more detail below. For the FIGS. 12, 13, 14, and 15 below, only the structures at one end (such as the hot end) of the AMR bed are shown. Similar structures should be placed at the other end (such as the cold end) of the AMR bed.

Figure 12B:
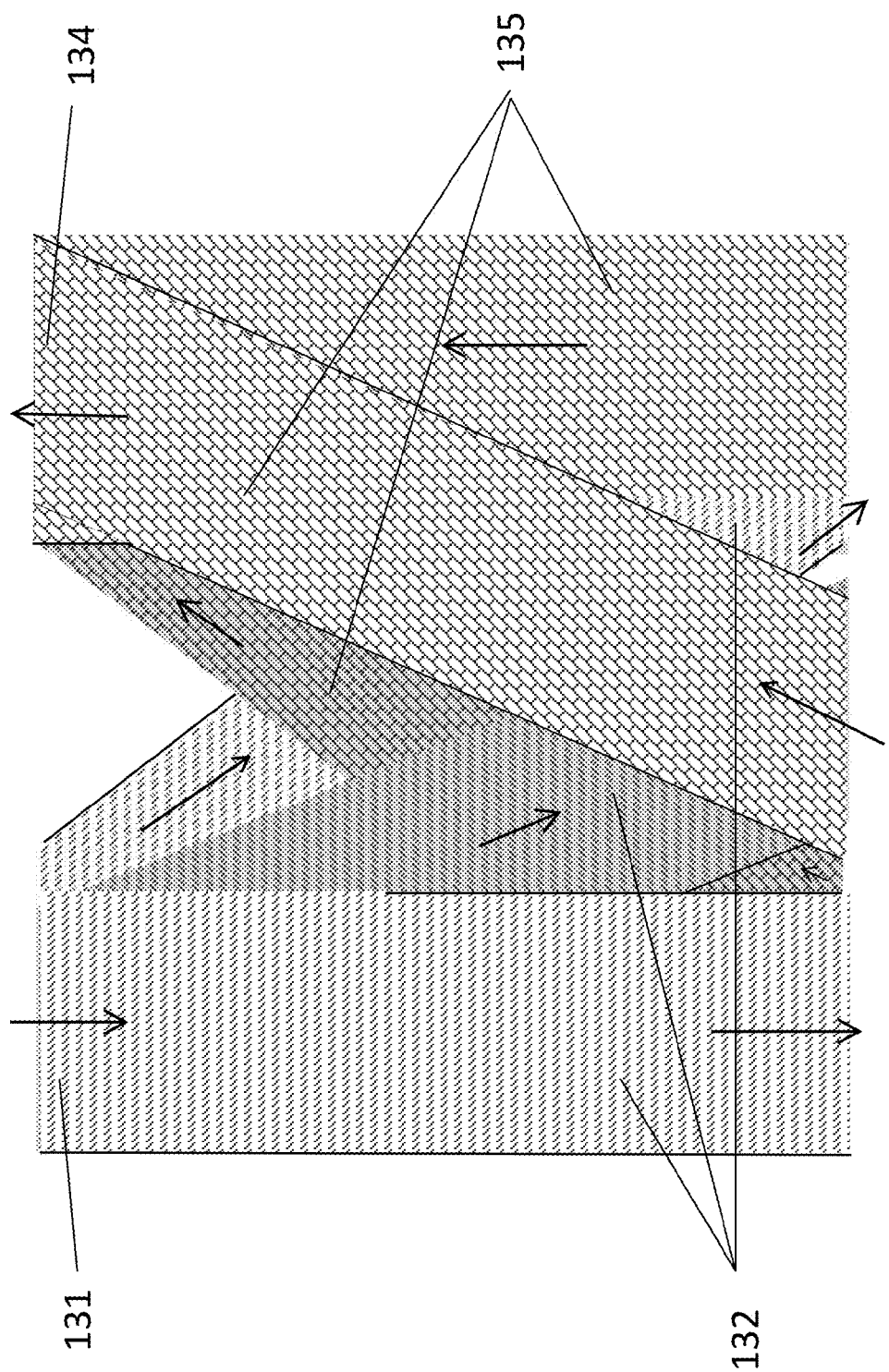
Figure 12C:
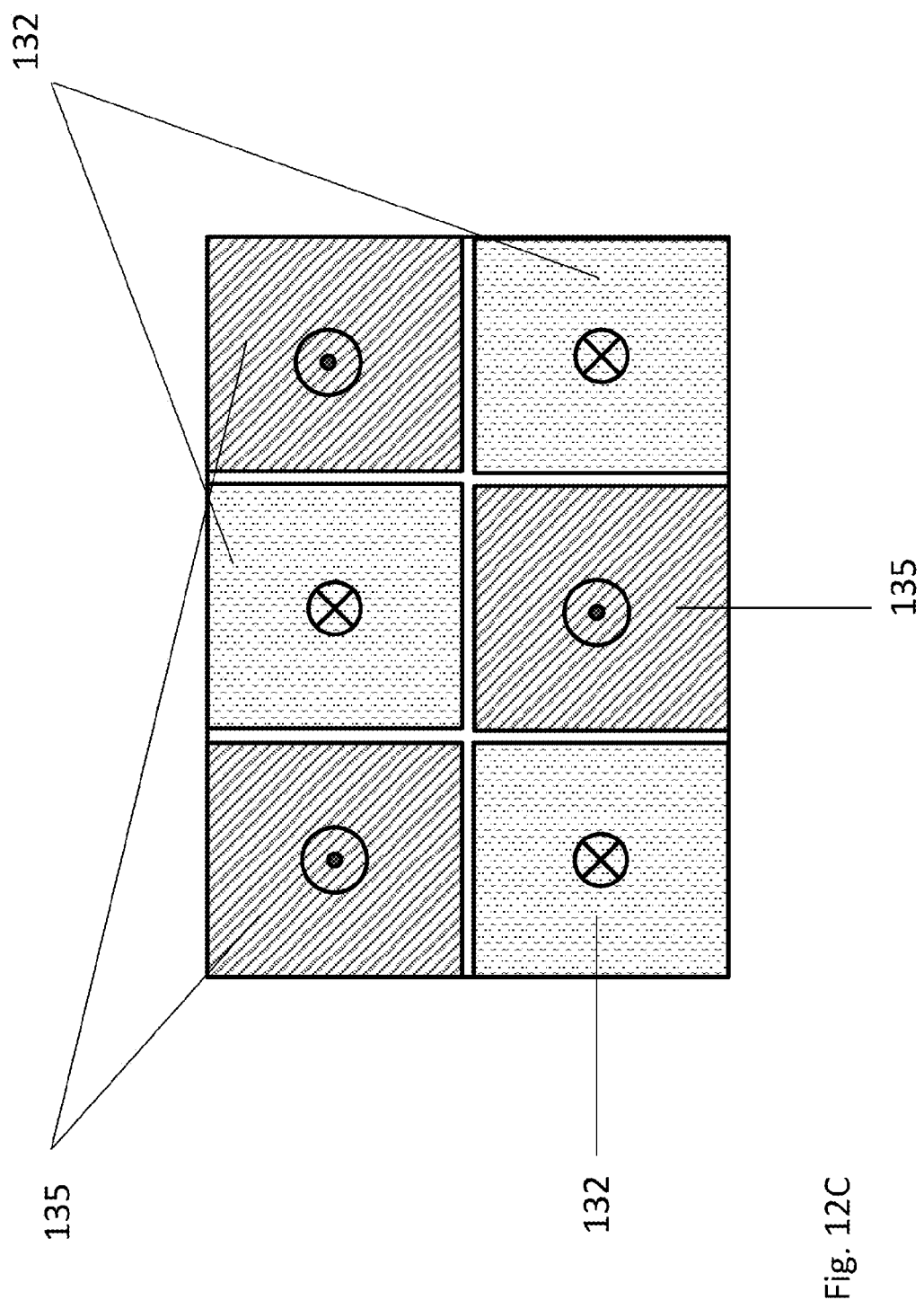

FIGS. 12a, 12b, and 12c show a second example of inlet and outlet pipes near an AMR bed with separation of inlet and outlet flows. FIG. 12a is a transparent side view, FIG. 12b is a solid side view, and FIG. 12c is a cross section taken at the plane A-A shown in FIG. 12a. The main inlet pipe 131 that carries flow from a HEX to the AMR bed divides into several smaller sub-passages in the form of sub-pipes 132, each of which connects to the AMR bed 133. The main outlet pipe 134 that carries flow from the AMR bed to a HEX divides into several smaller sub-passages in the form of sub-pipes 135, each of which connects to the AMR bed 133. Optionally, the sub-pipes 132 and 135 may further subdivide into multiple smaller sub-pipes before connecting to the AMR bed 133. The inlet and outlet sub-pipes 132 and 135 interleave to distribute flow such that bidirectional flow is developed over almost all of the AMR bed 133. The arrangement of pipes and sub-pipes may approach fractal geometry to obtain the best flow distribution and the lowest pressure drop.

Figure 13A:
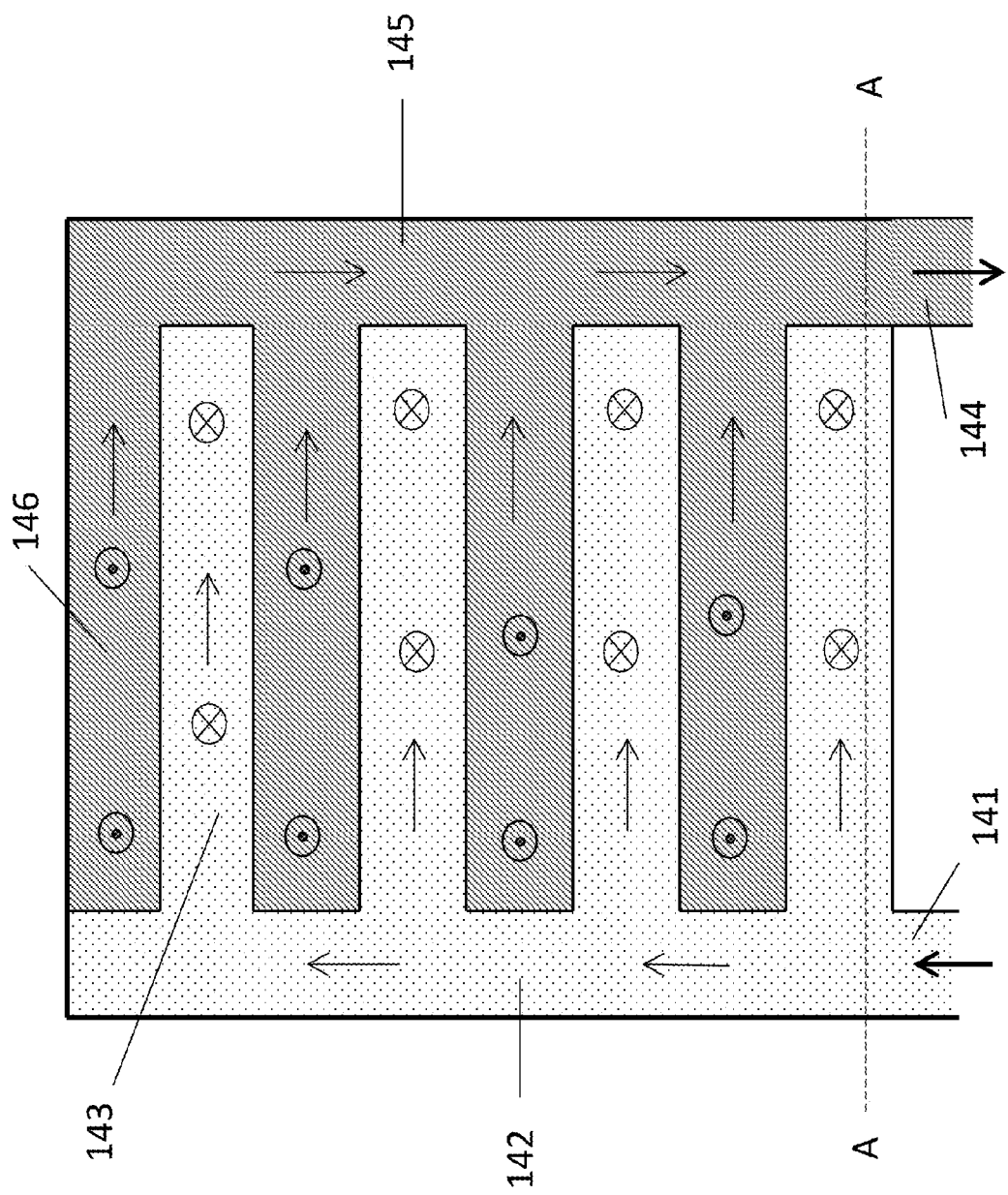
FIGS. 13A, 13B, and 13C show an AMR bed, with an inlet channel and an outlet channel that connect to sub-passage fingers that interleave in accordance with an illustrative embodiment.
Figure 13B:
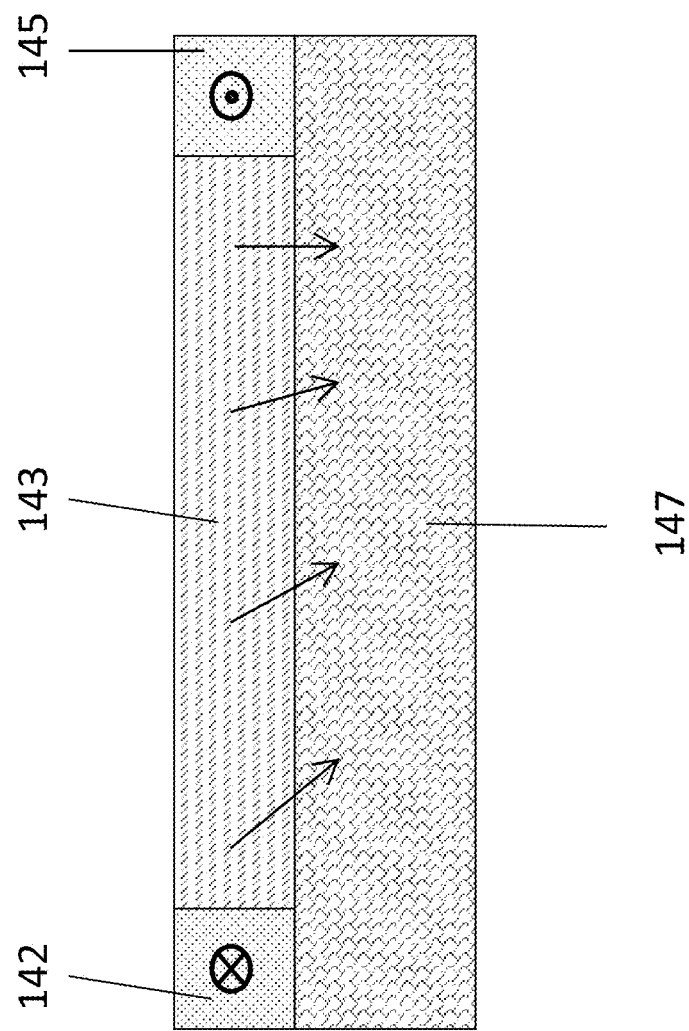

FIGS. 13a and 13b show a third example of inlet and outlet pipes near an AMR bed with separation of inlet and outlet flows. FIG. 13a is a top view, and FIG. 13b is a cross section taken at the plane A-A shown in FIG. 13a. The inlet pipe 141 connects to an inlet channel 142 on the left side that connects to sub-passages in the form of inlet fingers 143 that are substantially perpendicular to the inlet channel 142 and inlet pipe 141. The outlet pipe 144 connects to an outlet channel 145 on the right side that connects to sub-passages in the form of outlet fingers 146. The inlet and outlet fingers 143 and 146 interleave to distribute flow such that bidirectional flow is developed over almost all of the AMR bed 147.

Figure 13C:
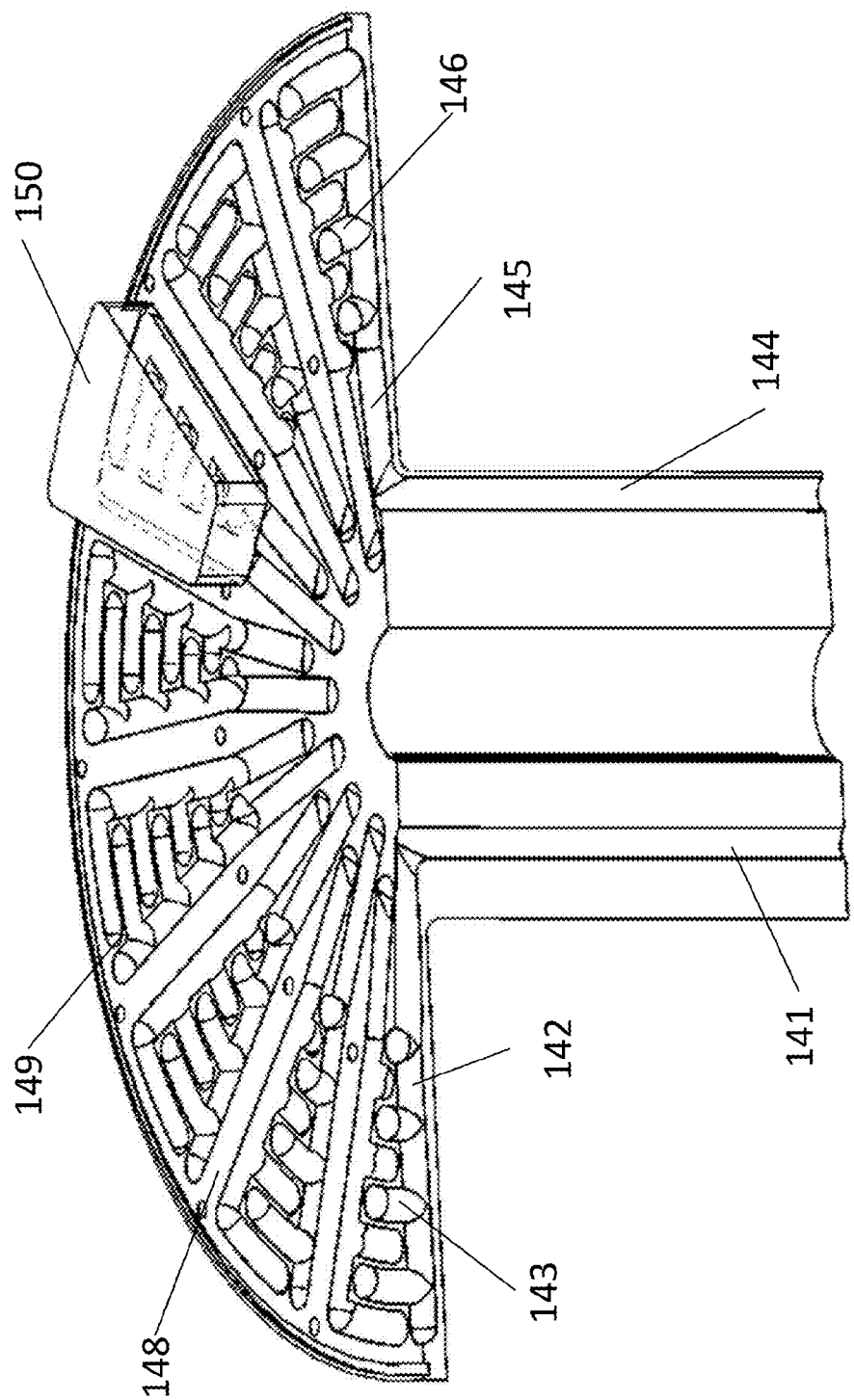

As space in the magnet gap comes at a premium, it is beneficial to minimize the volume required of both the AMR bed cover plate and the plenum region containing flow separators. In FIG. 13c, finger-like flow passages are cut into a homogenous cover plate 148 that covers multiple sector-shaped AMR beds 150. An inlet pipe 141 connects to an inlet channel 142 that connects to sub-passages in the form of inlet fingers 143. An outlet pipe 144 connects to an outlet channel 145 that connects to sub-passages in the form of outlet fingers 146. The assembly serves both structural and flow functions with flow distribution provided by the relief sub-passages 143 and 146 in the cover plate 148. The planar flat surface terminating the cover plate is intended to sit directly below sector-shaped MCM beds 150, and rounded passageways serve as an efficient conduit for flow. An internal pressure will form in the flow passages as a result of the fluid flow, which could result in distortion of the piping and sub-passages that carry the flow. The flow division barriers 149 left between relieved flow sub-passages 143 and 146 serve the additional purpose of stiffening the cover plate 148 against distortion in the manner typical of a ribbed structure.

Figure 14A:
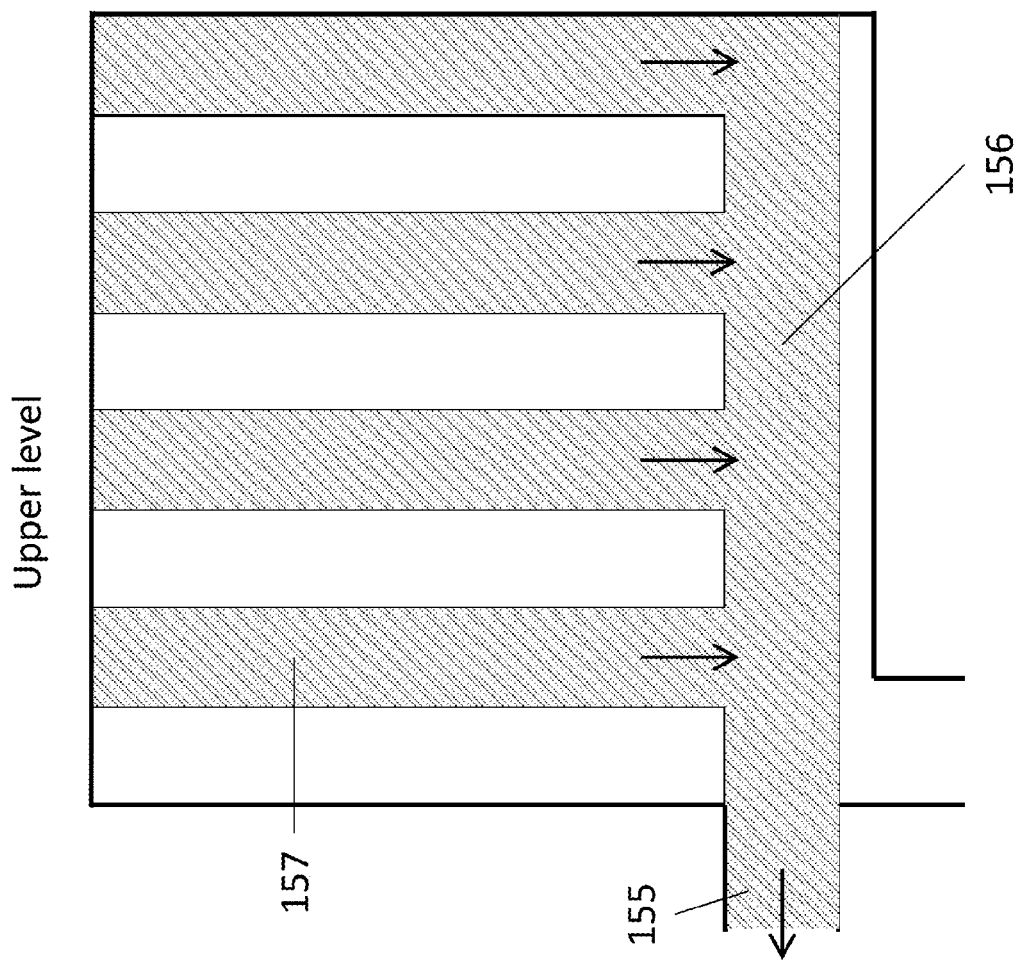
FIGS. 14A, 14B, and 14C show an AMR bed, with inlet and outlet pipes near the AMR bed that divide into lengthwise sub-passage slots that interleave in accordance with an illustrative embodiment.
Figure 14B:
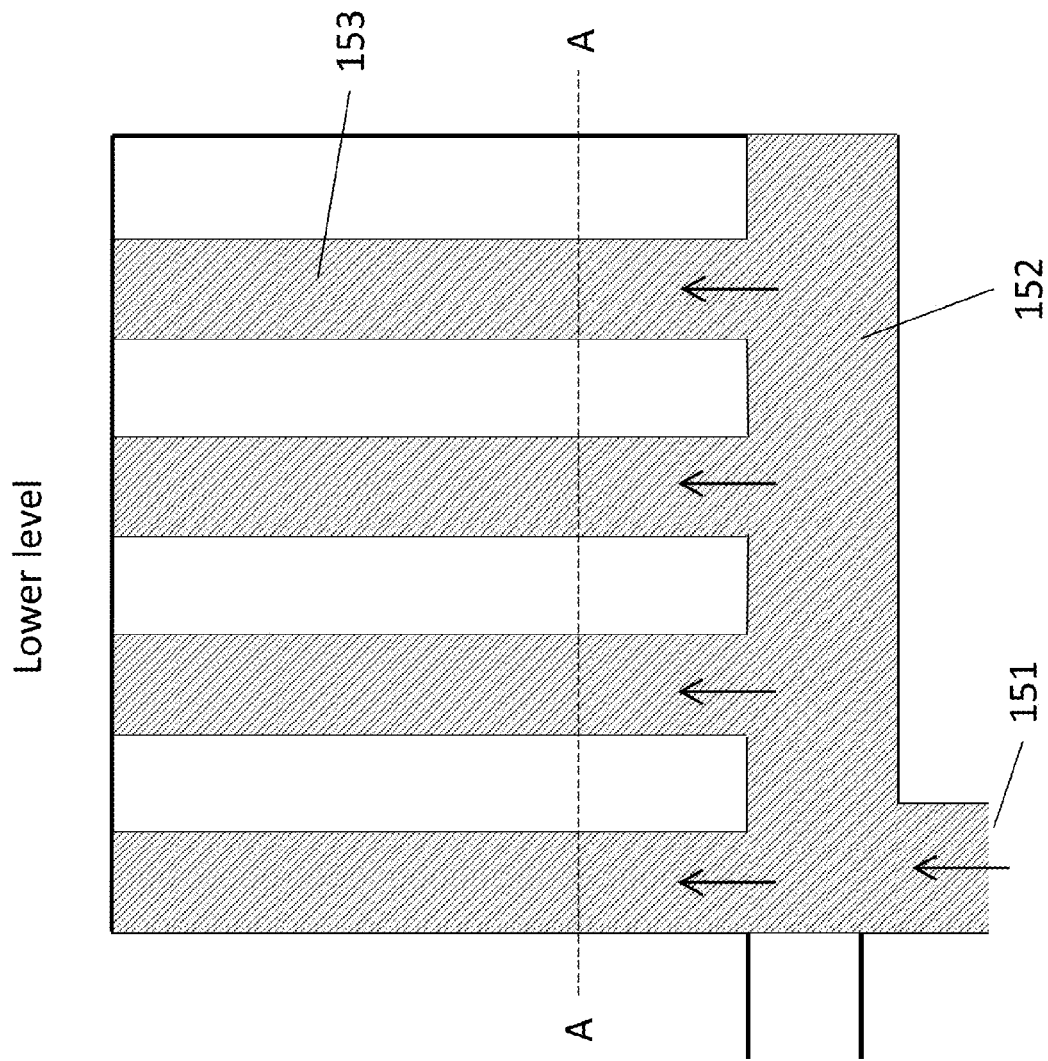
Figure 14C:
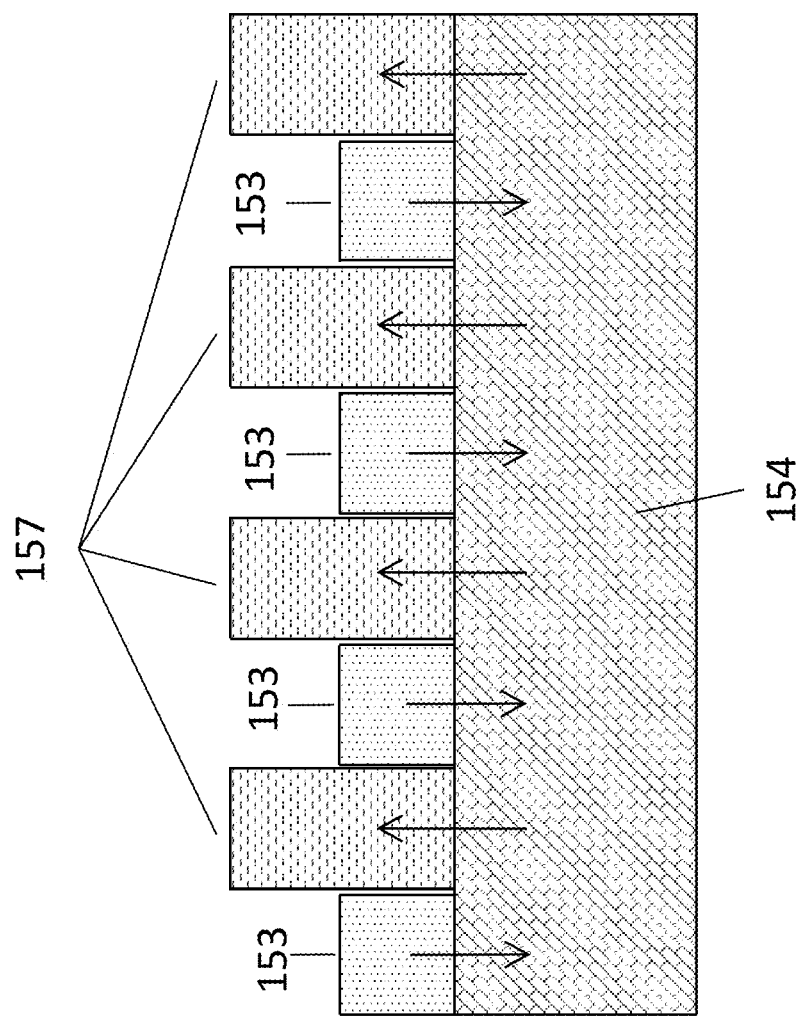

FIGS. 14a, 14b, and 14c show a fourth example of inlet and outlet pipes near an AMR bed with separation of inlet and outlet flows. FIG. 14a is a top view taken at an upper level, FIG. 14b is a top view taken at a lower level, and FIG. 14c is a cross-section taken at the plane A-A shown in FIG. 14b. An inlet pipe 151 connects to a sideways main inlet channel 152 and lengthwise sub-passages in the form of inlet fingers 153 above the AMR bed 154. The fingers 153 connect to the upper side of AMR bed 154. An outlet pipe 155 connects to a sideways main outlet channel 156 above the inlet channel 152 and above the AMR bed 154. The outlet channel 156 connects to lengthwise passages in the form of outlet fingers 157 that pass between the inlet fingers 153 and connect to the upper side of AMR bed 154. The fingers 153 carry flow in to the bed 154, and the fingers 157 carry flow out of the AMR bed 154. The inlet and outlet fingers 153 and 157 interleave at the bed 154 to distribute flow such that bidirectional flow is developed over almost all of the AMR bed 154.

Figure 15B:
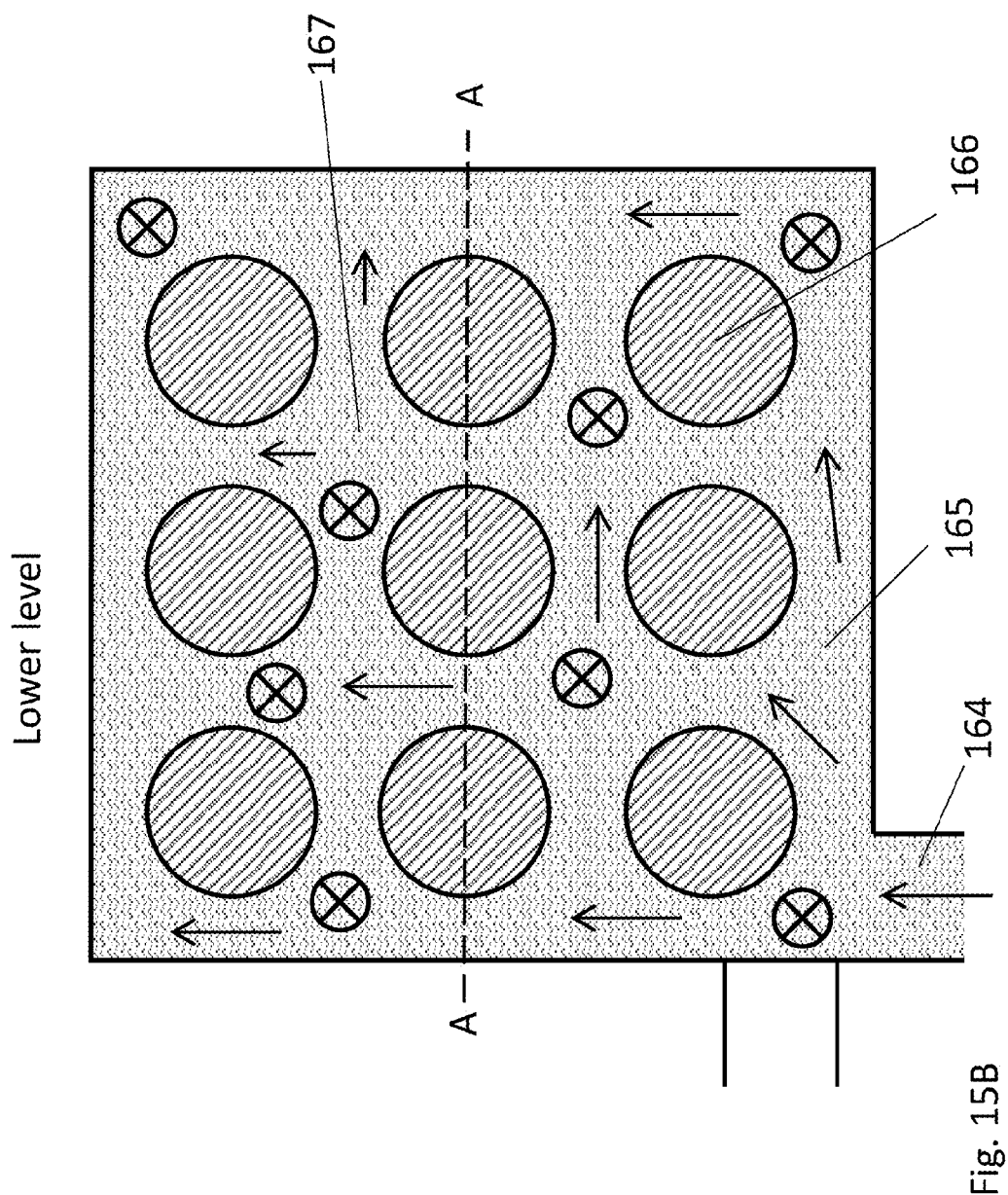
Figure 15C:
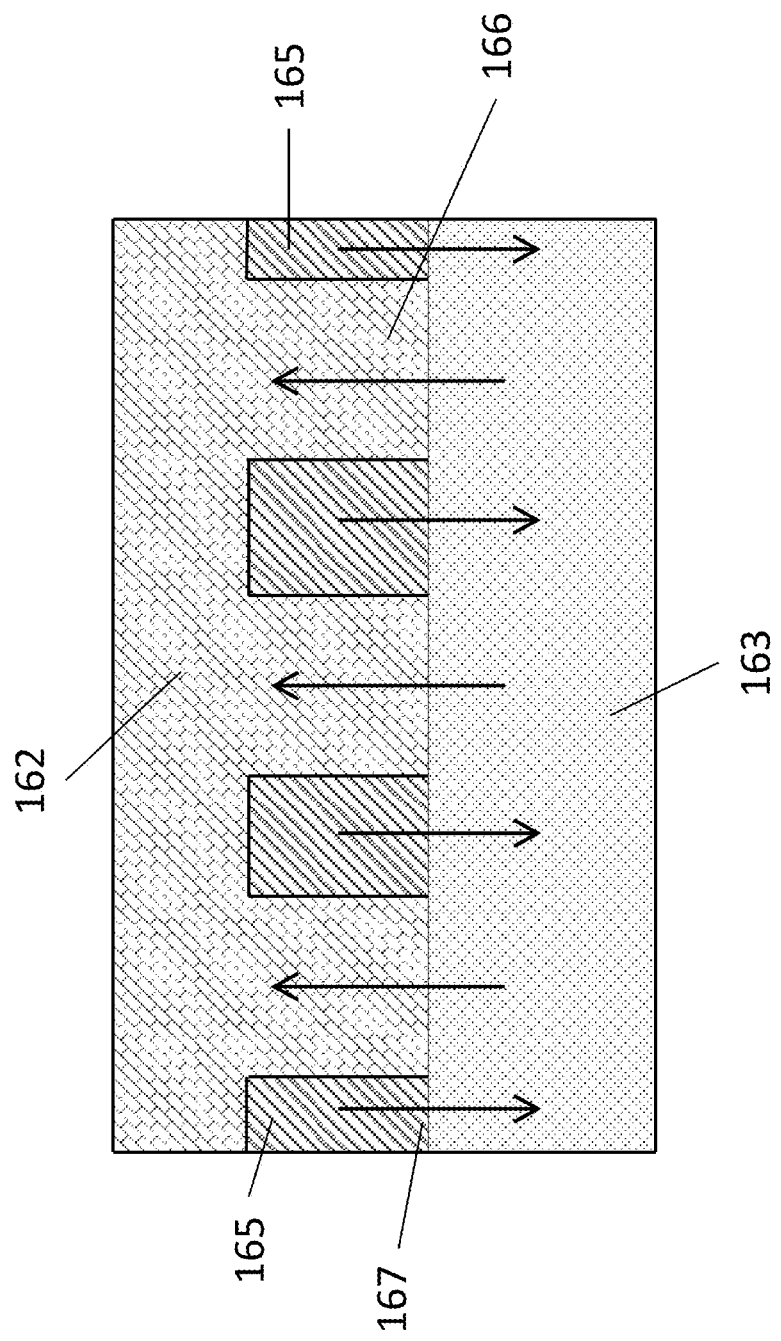

FIGS. 15a, 15b, and 15c show a fifth example of inlet and outlet pipes near an AMR bed with separation of inlet and outlet flows. The outlet pipe 161 spreads out into an upper outlet plenum 162 near the AMR bed 163, and the inlet pipe 164 spreads out in a lower inlet plenum 165 between the AMR bed 163 and the inlet plenum 162. The outlet plenum 162 is connected to the bed 163 by sub-passages in the form of multiple pipes 166 spread out over the lower surface of the outlet plenum 162 and passing through the inlet plenum 165. The inlet plenum 165 connects to the cold end of the AMR bed 163 in sub-passages in the areas 167 between the pipes 166 from the inlet plenum 162. The inlet and outlet regions 166 and 167 interleave to distribute flow such that bidirectional flow is developed over almost all of the AMR bed 163.

Accumulation of contaminating particles may occur on the surface of the AMR bed during extended operation with separated inlet and outlet flows. A solution to this problem has been found, which is to observe the pressure in the AMR system at the inlet to the bed, and upon increase in pressure, to reverse the flow direction for a short period of time and direct the flow coming from the AMR bed to a filter. Particles that become lodged on the inlet surfaces of the AMR bed can be dislodged by the reversed flow, and can be removed by the filter. The flow direction reversal might be implemented when the normal direction pressure drop has increased by 20% over its initial value, and might be continued for 100 AMR flow cycles.

Although the text uses the term "pipe" and some of the figures show pipes that carry the fluid flow between components of the invention, any suitable conduits that carry the fluid between the components might be used. For example, the conduits might be fluid passages in an injection-molded assembly, or the conduits might be fluid passages in an assembly made by additive manufacturing, or the conduits might be conventional pipes.

One or more flow diagrams and/or block diagrams have been used to describe exemplary embodiments. The use of any flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An active magnetic regenerative (AMR) refrigerator apparatus, comprising:
   at least one AMR bed with a first end and a second end;
   a first heat exchanger (HEX) with a first end and a second end;
   a first pipe that fluidly connects the first end of the first HEX to the first end of the AMR bed;
   a second pipe that fluidly connects the second end of the first HEX to the first end of the AMR bed; and
   wherein the first pipe divides into two or more sub-passages at the AMR bed,
   wherein the second pipe divides into two or more sub-passages at the AMR bed, and
   wherein the sub-passages of the first pipe and the second pipe interleave at the AMR bed.

2. The apparatus of claim 1, further comprising a pump configured to drive heat transfer fluid through the first pipe, the second pipe, the first HEX, and pores of the AMR bed.

3. The apparatus of claim 1, wherein the sub-passages of the first pipe are extensions of the first pipe in a direction substantially perpendicular to the first pipe.

4. The apparatus of claim 1, wherein the sub-passages fluidly connect to the AMR bed by slots.

5. The apparatus of claim 1, further comprising:
   a second heat exchanger (HEX) with a first end and a second end;
   a third pipe that fluidly connects the first end of the second HEX to the second end of the AMR bed;
   a fourth pipe that fluidly connects the second end of the second HEX to the second end of the AMR bed; and
   wherein the third pipe divides into two or more sub-passages at the AMR bed,
   wherein the fourth pipe divides into two or more sub-passages at the AMR bed, and
   wherein the sub-passages of the third pipe and the fourth pipe interleave at the AMR bed.

6. An active magnetic regenerative (AMR) refrigerator, comprising:
   at least one AMR bed with a first end and a second end;
   a heat exchanger (HEX);
   a heat transfer fluid;
   a first pipe that fluidly connects the first end of the HEX to the first end of the AMR bed;
   a second pipe that fluidly connects the second end of the HEX to the first end of the AMR bed; and
   a pump configured to drive the heat transfer fluid through the first pipe, the second pipe, the HEX, and pores of the AMR bed,
   wherein the first pipe is connected to a first channel extending over a first portion of the first end of the AMR bed, and the second pipe is connected to a second channel extending over a second portion of the first end of the AMR bed, wherein the first channel is fluidly connected to the AMR bed through slots formed in a lower wall of the first channel that extend under a portion of the second channel, and wherein the second channel is fluidly connected to the AMR bed through slots formed in a lower wall of the second channel that extend under a portion of the first channel.

7. An active magnetic regenerative (AMR) refrigerator, comprising:
   at least one AMR bed with a first end and a second end;
   a heat exchanger (HEX);
   a heat transfer fluid;
   a first pipe that connects the HEX to the first end of the AMR bed, wherein the first pipe is configured to direct the heat transfer fluid in a unidirectional flow in a first mode of operation, and wherein the first pipe is further configured to direct the heat transfer fluid in a second unidirectional flow in a second mode of operation; and
a pump configured to drive the heat transfer fluid in the first unidirectional flow and the second unidirectional flow.

8. The AMR refrigerator of claim 7, wherein the second unidirectional flow is opposite the first unidirectional flow, and the second unidirectional flow is configured to eject accumulated contaminating particles from the first end of the AMR bed.

9. An active magnetic regenerative (AMR) refrigerator apparatus, comprising:
a first AMR bed with a cold end and a hot end, wherein the first AMR bed comprises a magnetocaloric material;
a magnet configured to apply a time-varying magnetic field to the first AMR bed in a high state and a low state;
a cold heat exchanger (CHEX) with an inlet end and an outlet end;
a hot heat exchanger (HHEX) with an inlet end and an outlet end;
a heat transfer fluid;
valves configured to direct flow of the heat transfer fluid from the cold end of the first AMR bed, through the first AMR bed, and to the hot end of the first AMR bed when the time-varying magnetic field applied to the first AMR bed is in the high state, wherein the valves are further configured to direct flow of the heat transfer fluid from the HHEX, to the hot end of the first AMR bed, through the first AMR bed, to the cold end of the first AMR bed, and through the CHEX when the time-varying magnetic field applied to the first AMR bed is in the low state;
a first pipe that fluidly connects the inlet end of the CHEX to the cold end of the first AMR bed, wherein the first pipe divides into two or more sub-passages at the first AMR bed;
a second pipe that fluidly connects the outlet end of the CHEX to the cold end of the first AMR bed, wherein the second pipe divides into two or more sub-passages at the first AMR bed;
a third pipe that fluidly connects the inlet end of the HHEX to the hot end of the first AMR bed, wherein the third pipe divides into two or more sub-passages at the first AMR bed;
a fourth pipe that fluidly connects the outlet end of the HHEX to the hot end of the first AMR bed, wherein the fourth pipe divides into two or more sub-passages at the first AMR bed; and
a pump configured to drive the heat transfer fluid through the first AMR bed, the CHEX, the HHEX, the valves, the first pipe, the second pipe, the third pipe, and the fourth pipe.

10. The apparatus of claim 9 wherein the sub-passages of the first pipe and the sub-passages of the second pipe interleave at the first AMR bed, and wherein the sub-passages of the third pipe and the sub-passages of the fourth pipe interleave at the first AMR bed.

11. The apparatus of claim 9 wherein a flow of the heat transfer fluid in the sub-passages of the first pipe, the second pipe, the third pipe, and the fourth pipe are substantially unidirectional, and a flow of the heat transfer fluid in the first AMR bed is substantially bi-directional.

12. The apparatus of claim 9, further comprising a second AMR bed with a cold end and a hot end, wherein the second AMR bed comprises a magnetocaloric material,
wherein the magnet is further configured to apply a time-varying magnetic field to the second AMR bed in a high state and a low state,
wherein the valves are further configured to direct flow of the heat transfer fluid from the cold end of the second AMR bed, through the second AMR bed, and to the hot end of the second AMR bed when the time-varying magnetic field applied to the second AMR bed is in the high state, and wherein the valves are configured to direct flow of the heat transfer fluid from the HHEX, to the hot end of the second AMR bed, through the second AMR bed, to the cold end of the second AMR bed, and through the CHEX when the time-varying magnetic field applied to the first AMR bed is in the low state, and
wherein the pump is further configured to drive the heat transfer fluid through the second AMR bed.

13. The apparatus of claim 12 further comprising:
a fifth pipe that connects the inlet end of the CHEX to the cold end of the second AMR bed, wherein the fifth pipe divides into two or more sub-passages at the second AMR bed;
a sixth pipe that connects the outlet end of the CHEX to the cold end of the second AMR bed, wherein the sixth pipe divides into two or more sub-passages at the second AMR bed;
a seventh pipe that connects the inlet end of the HHEX to the hot end of the second AMR bed, wherein the seventh pipe divides into two or more sub-passages at the second AMR bed; and
an eighth pipe that connects the outlet end of the H HEX to the hot end of the second AMR bed, wherein the eighth pipe divides into two or more sub-passages at the second AMR bed,
wherein the pump is further configured to drive the heat transfer fluid through the fifth pipe, the sixth pipe, the seventh pipe, and the eighth pipe.

14. The apparatus of claim 12, wherein the time-varying magnetic field applied to the first AMR bed is offset from the time-varying magnetic field applied to the second AMR bed.

15. A method comprising:
pumping a heat transfer fluid through a first pipe from a first end of a first heat exchanger (HEX) to a first end of an active magnetic regenerative (AMR) bed, wherein the first pipe divides into two or more sub-passages at the AMR bed; and
pumping the heat transfer fluid through a second pipe to a second end of the first HEX from the first end of the AMR bed, wherein the second pipe divides into two or more sub-passages at the AMR bed, and
wherein the sub-passages of the first pipe and the second pipe interleave at the AMR bed.

16. The method of claim 15, further comprising:
pumping the heat transfer fluid through a third pipe from a first end of a second HEX to a second end of the AMR bed, wherein the third pipe divides into two or more sub-passages at the AMR bed; and
pumping the heat transfer fluid through a fourth pipe to a second end of the second HEX from the second end of the AMR bed, wherein the fourth pipe divides into two or more sub-passages at the AMR bed, and
wherein the sub-passages of the third pipe and the fourth pipe interleave at the AMR bed.

17. A method comprising:
applying a time-varying magnetic field to an active magnetic regenerative (AMR) bed in a first mode of operation;

applying the time-varying magnetic field to the AMR bed in a second mode of operation;

pumping a heat transfer fluid through a first pipe that connects a heat exchanger (HEX) to a first end of the AMR bed in a unidirectional flow when the time-varying magnetic field is in the first mode of operation; and pumping the heat transfer fluid through the first pipe in a second unidirectional flow in a second mode of operation, wherein the first unidirectional flow and the second unidirectional flow are opposite from each other.

* * * * *